United States Patent
Lee et al.

(10) Patent No.: US 7,622,071 B2
(45) Date of Patent: Nov. 24, 2009

(54) APPARATUS FOR MANUFACTURING COMPACTED IRONS OF REDUCED MATERIALS COMPRISING FINE DIRECT REDUCED IRONS AND APPARATUS FOR MANUFACTURING MOLTEN IRONS USING THE SAME

(75) Inventors: Kwang-Hee Lee, Pohang (KR); Sung-Kee Shin, Pohang (KR); Min-Chul Park, Pohang (KR); Sang-Hoon Joo, Pohang (KR); Deuk-Chae Kim, Pohang (KR); Soo-Young Bang, Pohang (KR); Kwang-Soo Choi, Pohang (KR); Il-Hyun Cho, Pohang (KR); Seung-Ho Choi, Pohang (KR); Myung-Sik Kim, Pohang (KR); Chong-Won Choi, Pohang (KR)

(73) Assignee: Posco, Nam-ku, Pohang-shi, Kyungsangbuk-do (KR)

( * ) Notice: Subject to any disclaimer, the term of this patent is extended or adjusted under 35 U.S.C. 154(b) by 169 days.

(21) Appl. No.: 11/575,525

(22) PCT Filed: Oct. 18, 2005

(86) PCT No.: PCT/KR2005/003465

§ 371 (c)(1),
(2), (4) Date: Mar. 19, 2007

(87) PCT Pub. No.: WO2006/043770

PCT Pub. Date: Apr. 27, 2006

(65) Prior Publication Data

US 2007/0216072 A1 Sep. 20, 2007

(30) Foreign Application Priority Data

Oct. 19, 2004 (KR) .................. 10-2004-0083446
Dec. 2, 2004 (KR) .................. 10-2004-0100249
Sep. 12, 2005 (KR) .................. 10-2005-0084615

(51) Int. Cl.
C22B 1/24 (2006.01)
(52) U.S. Cl. .................. 266/176; 75/770; 75/771
(58) Field of Classification Search .................. 75/746, 75/436, 770, 771; 222/138, 145.1; 100/907; 425/237; 419/69; 266/176, 177; 193/2 A
See application file for complete search history.

(56) References Cited

U.S. PATENT DOCUMENTS

| 2,949,634 | A | * | 8/1960 | Shipley ................ 425/194 |
| 4,033,559 | A | | 7/1977 | Pietsch |
| 4,769,211 | A | * | 9/1988 | Langner ................ 419/3 |
| 5,534,046 | A | | 7/1996 | Kepplinger et al. |
| 6,074,456 | A | * | 6/2000 | Freytag et al. ................ 75/436 |
| 6,352,573 | B2 | | 3/2002 | McClelland, Jr. et al. |
| 6,755,365 | B1 | * | 6/2004 | Meredith ................ 241/29 |
| 2001/0047698 | A1 | | 12/2001 | McClelland, Jr. et al. |
| 2003/0146318 | A1 | * | 8/2003 | Condon ................ 241/236 |
| 2005/0050996 | A1 | * | 3/2005 | Gannon et al. ................ 75/751 |

FOREIGN PATENT DOCUMENTS

DE  2514703 B1  7/1976

(Continued)

*Primary Examiner*—Melvin C Mayes
*Assistant Examiner*—James Corno

(57) ABSTRACT

The present invention relates to an apparatus for manufacturing compacted irons of the reduced materials containing fine reduce irons and an apparatus for manufacturing molten irons provided with the same. The apparatus for manufacturing compacted irons according to the present invention includes a couple of rollers for compacting reduced materials containing fine reduced irons and manufacturing compacted irons, a guide chute for guiding compacted irons which are discharged from the couple of rollers; and crushers for crushing compacted irons which are guided into the guide chute. A guiding surface of the guide chute, which guides the compacted irons, includes a straight slanted surface and a curved slanted surface.

57 Claims, 18 Drawing Sheets

FOREIGN PATENT DOCUMENTS

| | | | |
|---|---|---|---|
| DE | 3507166 A1 * | 9/1986 |
| DE | 19545985 A1 | 6/1997 |
| DE | 10156735 | 6/2003 |
| EP | 212909 A2 * | 3/1987 |
| EP | 0594557 A | 4/1994 |
| JP | 62-228418 | 10/1987 |
| WO | 95/09080 A | 4/1995 |
| WO | WO 2004057042 | 7/2004 |
| WO | WO 2004057042 A1 * | 7/2004 |

* cited by examiner

APPARATUS FOR MANUFACTURING COMPACTED IRONS OF REDUCED MATERIALS COMPRISING FINE DIRECT REDUCED IRONS AND APPARATUS FOR MANUFACTURING MOLTEN IRONS USING THE SAME

BACKGROUND OF THE INVENTION (a) Field of the Invention

The present invention relates to an apparatus for manufacturing compacted irons and an apparatus for manufacturing molten irons provided with the same, more specifically to an apparatus for manufacturing compacted irons of reduced materials containing direct reduced irons and an apparatus for manufacturing molten irons provided with the same.

(b) Description of the Related Art

The iron and steel industry is a core industry that supplies the basic materials needed in construction and in the manufacture of automobiles, ships, home appliances, etc. Further, it is one of the oldest industries which have advanced since the dawn of human history. Iron works, which play a pivotal role in the iron and steel industry, produce steel from molten iron, and then supply it to customers, after producing molten irons (i.e., pig irons in a molten state) using iron ores and coals as raw materials.

Currently, approximately 60% of the world's iron production is produced using a blast furnace method that has been in development since the 14th century. According to the blast furnace method, iron ores, which have gone through a sintering process, and cokes, which are produced using bituminous coals as raw materials, are charged into a blast furnace together and oxygen is supplied thereto to reduce the iron ores to irons, and thereby manufacturing molten irons. The blast furnace method, which is the most popular in plants for manufacturing molten irons, requires that raw materials have a strength of at least a predetermined level and have grain sizes that can ensure permeability in the furnace, taking into account reaction characteristics. For that reason, cokes that are obtained by processing specific raw coals are needed as carbon sources to be used as a fuel and as a reducing agent. Also, sintered ores that have gone through a successive agglomerating process are needed as iron sources. Accordingly, the modern blast furnace method requires raw material preliminary processing equipment, such as coke manufacturing equipment and sintering equipment. Namely, it is necessary to be equipped with subsidiary facilities in addition to the blast furnace, and to also have equipment for preventing and minimizing pollution generated by the subsidiary facilities. Therefore, a heavy investment in the additional facilities and equipment leads to increased manufacturing costs.

In order to solve these problems with the blast furnace method, significant effort has been made in iron works all over the world to develop a smelting reduction process that produces molten irons by directly using raw coals as a fuel and a reducing agent and by directly using fine ores, which account for more than 80% of the world's ore production.

An installation for manufacturing molten irons directly using raw coals and fine iron ores is disclosed in U.S. Pat. No. 5,534,046. The apparatus for manufacturing molten irons disclosed in U.S. Pat. No. 5,534,046 includes three-stage fluidized-bed reactors forming a bubbling fluidized bed therein and a melter-gasifier connected thereto. The fine iron ores and additives at room temperature are charged into the first fluidized-bed reactor and successively go through three-stage fluidized-bed reactors. Since hot reducing gas produced from the melter-gasifier is supplied to the three-stage fluidized-bed reactors, the temperature of the iron ores and additives, which were at room temperature, is raised by contact with the hot reducing gas. Simultaneously, 90% or more of the iron ores and additives are reduced and 30% or more of them are sintered, and they are charged into the melter-gasifier.

A coal packed bed is formed in the melter-gasifier by supplying coals thereto. Therefore, iron ores and additives at room temperature are melted and slagged in the coal packed bed and are then discharged as molten irons and slags. The oxygen supplied from a plurality of tuyeres installed on the outer wall of the melter-gasifier burns a coal packed bed and is converted to a hot reducing gas. Then, the hot reducing gas is supplied to the fluidized-bed reactors, and thereby reducing iron ores and additives and is exhausted outside.

However, since a high-speed gas flow is formed in the upper portion of the melter-gasifier included in the above-mentioned apparatus for manufacturing molten irons, there is a problem in that the fine reduced irons and sintered additives charged into the melter-gasifier are scattered and loosened. Furthermore, when fine reduced irons and sintered additives are charged into the melter-gasifier, there is a problem in that permeability of gas and liquid in the coal packed bed of the melter-gasifier cannot be ensured.

For solving these problems, the method for briquetting fine reduced irons and additives and charging them into the melter-gasifier has been developed. Relating to the above development, U.S. Pat. No. 5,666,638 discloses a method for manufacturing oval-shaped briquettes made of sponge irons and an apparatus using the same. In addition, U.S. Pat. Nos. 4,093,455, 4,076,520 and 4,033,559 disclose a method for manufacturing plate-shaped or corrugated briquettes made of sponge irons and an apparatus using the same. Here, fine reduced irons are hot briquetted and then cooled, and thereby they are manufactured into briquettes made of sponge irons in order to suitably transport them a long distance.

When the briquettes made of sponge irons are manufactured by using the above-mentioned method, a plurality of problems occur. This will be explained in detail below.

First, hot briquettes manufactured by using the above-mentioned method can be temporarily stored or be charged into the melter-gasifier and melted therein. In this case, hot briquettes are transported to a temporary storage bin or a melter-gasifier through a transporting chute. Since the temperature of hot briquettes is about 700° C., the transporting chute is impacted by the briquettes. Therefore, the transporting chute is thermally expanded and is thermally contracted, and thereby it is seriously worn or deformed. In this case, the transporting chute is blocked since it is distorted or broken. In particular, when hot briquettes are crushed and transported, there is a great possibility that the transporting chute will be blocked since fine reduce irons are generated.

For solving these problems, a transporting chute made of a stainless steel having thermal resistance and wear resistance has been used. Since the transporting chute made of a stainless steel has a high thermal expansion ratio, the transporting chute is multiply-divided and a separating space is formed therebetween for thermal expansion.

However, continuous problems occur in which the transporting chute is not only blocked since hot briquettes are accumulated in the separating space between the transporting chutes, but also that is breaks due to thermal deformation. In addition, a few parts of the transporting chute, which are broken, then enter a following apparatus which then becomes out of order. Furthermore, it is difficult to maintain the transporting chute due to hot reduced irons accumulated in the transporting chute.

Second, the briquettes manufactured by using the above-mentioned method are not suitable to be melted in the melter-gasifier. Generally, the density of briquettes, which are suitable to be melted in the melter-gasifier, is preferably in a range of 3.5 ton/m³ to 4.2 ton/m³. However, the briquettes made of sponge irons by using the above-mentioned method are not suitable for use in the melter-gasifier since the density thereof is too high. In addition, when the briquettes made of sponge irons are directly used in the melter-gasifier, it is not necessary for them to have a shape or strength sufficient to transport them a long distance. Therefore, when the briquettes made of sponge irons, which are manufactured by using the above-mentioned method, are charged into the melter-gasifier and then molten irons are manufactured, the cost for manufacturing molten irons is raised due to a greater use of energy than is necessary.

In addition, when briquettes made of sponge irons, whose grain size is not controlled, are charged into the melter-gasifier, briquettes made of sponge irons, which are not melted, fall to the front end of a tuyere for injecting oxygen, and thereby the tuyere for injecting oxygen is blocked. Therefore, a burning flame, which is formed from the front end of the tuyere for injecting oxygen into the coal packed bed, is backfired to the tuyere for injecting oxygen, and thereby damaging the tuyere resulting in poor operation of the melter-gasifier.

Third, it is difficult to smoothly transport the briquettes made of sponge irons when the briquettes are crushed by the crusher. In this case, a guide chute is used in order to suitably guide the compressively molded reduced irons to the crusher. However, the compressively molded briquettes are not successively discharged and are not smoothly charged into the crusher. Then, the middle portions thereof are broken, generating fine particles. Furthermore, there is a problem that a thermal load of the crusher, which follows the guide chute, is increased.

SUMMARY OF THE INVENTION

The present invention has been made to solve the above-mentioned problems, and provides an apparatus for manufacturing compacted irons that is suitable for manufacturing a large amount of compacted irons.

In addition, the present invention provides an apparatus for manufacturing molten irons provided with the apparatus for manufacturing compacted irons.

An apparatus for manufacturing compacted irons according to the present invention includes a couple of rollers for compacting reduced materials containing fine reduced irons and manufacturing compacted irons; a guide chute for guiding the compacted irons which are discharged from the couple of rollers; and crushers for crushing compacted irons which are guided into the guide chute. A guiding surface of the guide chute, which guides the compacted irons, includes a straight slanted surface and a curved slanted surface.

It is preferable that the couple of rollers includes a fixed roller and a moving roller facing the fixed roller and that a distance from an upper end portion of the guiding surface to a center of the fixed roller is not less than a sum of a radius of the fixed roller and a half of a mean thickness of the compacted irons.

The distance from the upper end portion of the guiding surface to the center of the fixed roller is preferably not more than a sum of the radius of the fixed roller and a mean thickness of the compacted irons.

The upper end portion of the guiding surface is preferably closer to the fixed roller than to the moving roller.

It is preferable that the upper end portion of the guiding surface is located at a position which is not higher than a height of the center axis of the fixed roller and is not lower than a surface height of the lower end portion of the fixed roller.

The upper portion of the guiding surface may be formed to be a straight slanted surface and the lower portion of the guiding surface is formed to be a curved slanted surface which is connected to the straight slanted surface.

A ratio of a height of the upper portion of the guiding surface to a height of the lower portion of the guiding surface is preferably in a range of 5.0 to 6.0.

An angle made between the straight slanted surface and a vertical direction is preferably in a range of 6 degrees to 8 degrees.

It is preferable that an angle made between the straight slanted surface and a vertical direction is substantially 7 degrees.

A radius of curvature of the curved slanted surface is preferably in a range of 1700 mm to 1900 mm.

It is preferable that the radius of curvature of the curved slanted surface is substantially 1800 mm.

It is preferable that a ratio of height of the guide chute to a length of a base line of the guide chute is in a range of 1.0 to 2.0.

Concave grooves may be continuously formed on a surface of each roller along the axis direction of the roller and a plurality of protruded portions may be formed on the concave grooves to be separated from each other.

The protruded portions may be shaped as notches and be protruded toward a circumference direction of the couple of rollers.

It is preferable that a thickness of the protruding portion becomes shorter toward a center of the protruding portion.

It is preferable that a pitch between a plurality of protruding portions is in a range of 16 mm to 45 mm.

The crushers may include a first crusher for coarsely crushing the compacted irons manufactured by the couple of rollers; and a second crusher for re-crushing the coarsely crushed compacted irons.

It is preferable that the first crusher coarsely crushes the compacted irons in order for a mean grain size of the compacted irons to be more than 0 mm and not more than 50 mm.

It is preferable that the first crusher coarsely crushes the compacted irons in order for a mean grain size of the compacted irons to be more than 0 mm and not more than 30 mm.

It is preferable that the compacted irons crushed in the second crusher include more than 0 wt % and not more than 30 wt % of compacted irons having a grain size in the range of 25 mm to 30 mm, not less than 55 wt % and less than 100 wt % of compacted irons having a grain size in the range of 5 mm to 25 mm; and more than 0 wt % and not more than 15 wt % of compacted irons having a grain size of less than 5 mm.

The first crusher may include a plurality of crushing plates installed side by side along the axis of the first crusher in order to be operated together; and a spacer ring inserted between the plurality of crushing plates and controllering the gap between the crushing plates. The crushing plate may be formed with a plurality of protrusions which are separated from each other and the plurality of protrusions may be formed on the circumference of the crushing plate. The compacted irons may be coarsely crushed by the plurality of protrusions as the plurality of crushing plates are operated.

The first crusher includes an integrated body on circumference of which a plurality of protrusions are formed to be separated from each other and the compacted irons may be coarsely crushed by the plurality of protrusions as the first crusher is operated.

The apparatus for manufacturing compacted irons may further include a dumping storage bin for temporarily storing the crushed compacted irons. The first crusher and the second crusher may be connected to the dumping storage bin through a transporting chute.

The second crusher includes a couple of crushing rollers installed to be separated from each other and provided with a plurality of crushing disks, and the coarsely crushed compacted irons may be re-crushed by a plurality of blades formed on the circumference of the crushing disks by operating the couple of crushing rollers in opposite directions to each other.

One crushing roller is a fixed roller and the other crushing roller is a moving roller among the couple of rollers and the gap between the couple of crushing rollers may be controllably varied.

The blade includes a first slanted surface directed to a rotating direction of the crushing roller and a second slanted surface directed to an opposite rotating direction of the crushing roller. It is preferable that a first slanted angle made between the first slanted surface and a circumference of the crushing roller is larger than a second slanted angle made between the second slanted surface and the circumference of the crushing roller.

It is preferable that one or more angles among the first slanted angle and the second slanted angle are in a range of 80 degrees to 90 degrees.

It is preferable that one or more angles among the first slanted angle and the second slanted angle are in a range of 40 degrees to 50 degrees.

The couple of crushing rollers include a first crushing roller and a second crushing roller. It is preferable that a plurality of first blades formed on a circumference of the first crushing roller face a space between the plurality of second blades formed on a circumference of the second crushing roller.

It is preferable that a distance from an end portion of the first blade to a surface of the second crushing roller facing the end portion of the first blade is in a range of 10 mm to 20 mm.

It is preferable that the end portion of each blade is chamfered.

It is preferable that a chamfered surface formed on the end portion of the first blade and a chamfered surface formed on the end portion of the second blade, which is closest to the first blade, face each other.

It is preferable that a distance from a chamfered surface formed on an upper end portion of the first blade and a chamfered surface formed on an upper end portion of the second blade, which is closest to the first blade, is in a range of 10 mm to 15 mm.

The second crusher includes a couple of crushing rollers separated from each other. The coarsely crushed compacted irons may be re-crushed by a plurality of blades formed on a circumference of the couple of crushing rollers by rotating the couple of rollers comprising an integrated body in opposite directions to each other.

It is preferable that that the apparatus for manufacturing compacted irons further includes a transporting chute under a lower portion of the couple of rollers for transporting the compacted irons. It is preferable that the transporting chute includes a plurality of linear chutes connected to each other and that a size of one end opening of the linear chute is smaller than a size of the other end opening of the linear chute.

The plurality of linear chutes may include a first linear chute and a second linear chute. One end opening of the second linear chute may be inserted into and be overlapped with the other end opening of the first linear chute.

It is preferable that the size of the first linear chute is the same as the size of the second linear chute.

The second linear chute and the first linear chute may be repeatedly arranged in order along the transporting direction of the reduced materials containing fine reduced irons.

It is preferable that one end opening of another first linear chute is inserted into and is overlapped with the other end opening of the second linear chute.

Each of the linear chutes may include a couple of side portions facing each other and a bottom portion which connects the couple of side portions together.

Each of the linear chutes may be integrally formed.

A stepping portion, which becomes lower along the transporting direction of the reduced materials containing fine reduced irons, may be formed on one end of the couple of the side portions forming one end opening of the linear chute.

The transporting chute may include a plurality of external casings enclosing the plurality of linear chutes and an external cover attached to each of the external casing.

A linear chute cover may be attached on the linear chute.

It is preferable that a plurality of $N_2$ purging connecting parts are installed on the external casing, and that the plurality of $N_2$ purging connecting parts are inserted into the transporting chute through an opening formed in the linear chute cover.

It is preferable that the plurality of $N_2$ purging connecting parts include a first $N_2$ purging connecting part and a second $N_2$ purging connecting part. The first $N_2$ purging connecting part is preferably installed to be slanted toward a lower portion of the transporting chute and the second $N_2$ purging connecting part is preferably installed to be slanted toward an upper portion of the transporting chute.

A plurality of supporting channels may be fixed between the external cover and the linear chute cover.

It is preferable that the supporting channel is concavely bent toward the linear chute cover.

A manhole may be attached to the external cover and the manhole may face the opening formed on the linear chute cover.

A couple of brackets may be attached to a side portion of the linear chute in order along a transporting direction of the reduced materials containing fine reduced irons.

The couple of brackets may include a first bracket and a second bracket and the first bracket and the second bracket may be attached in order along the transporting direction of the reduced materials containing fine reduced irons.

A plurality of fixing portions may be formed in the external casing and the bracket may be fixed to the fixing portion.

The plurality of fixing portions may include a first fixing portion and a second portion which is separated from the first fixing portion, and the first bracket may be combined with the first fixing portion with a screw.

The second fixing portion may be fixed to be separated from the second bracket.

Two of the linear chutes may be installed in the external casing.

Lagging materials may be filled between the external casing and the linear chutes.

It is preferable that a difference between a width of one end opening of the linear chute and a width of the other end opening of the linear chute is in a range of 10 cm to 25 cm.

It is preferable that a difference between a height of one end opening of the linear chute and a height of the other end opening of the linear chute is in a range of 10 cm to 25 cm.

The reduced materials containing fine reduced irons further include sintered additives.

The apparatus for manufacturing molten irons according to the present invention include the above-mentioned apparatus for manufacturing compacted irons; and a melter-gasifier in which the compacted irons are charged and melted.

One or more coals selected from the group of lumped coals and coal briquettes may be supplied to the melter-gasifier.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Now, exemplary embodiments of the present invention will be described with reference to the attached drawings in order for those skilled in the art to be able to work the present invention. However, the present invention can be embodied in various modifications and thus is not limited to the embodiments described below.

Embodiments of the present invention will be explained below with reference to FIGS. 1 to 14. The embodiments of the present invention are merely to illustrate the present invention and the present invention is not limited thereto.

Figure 1:
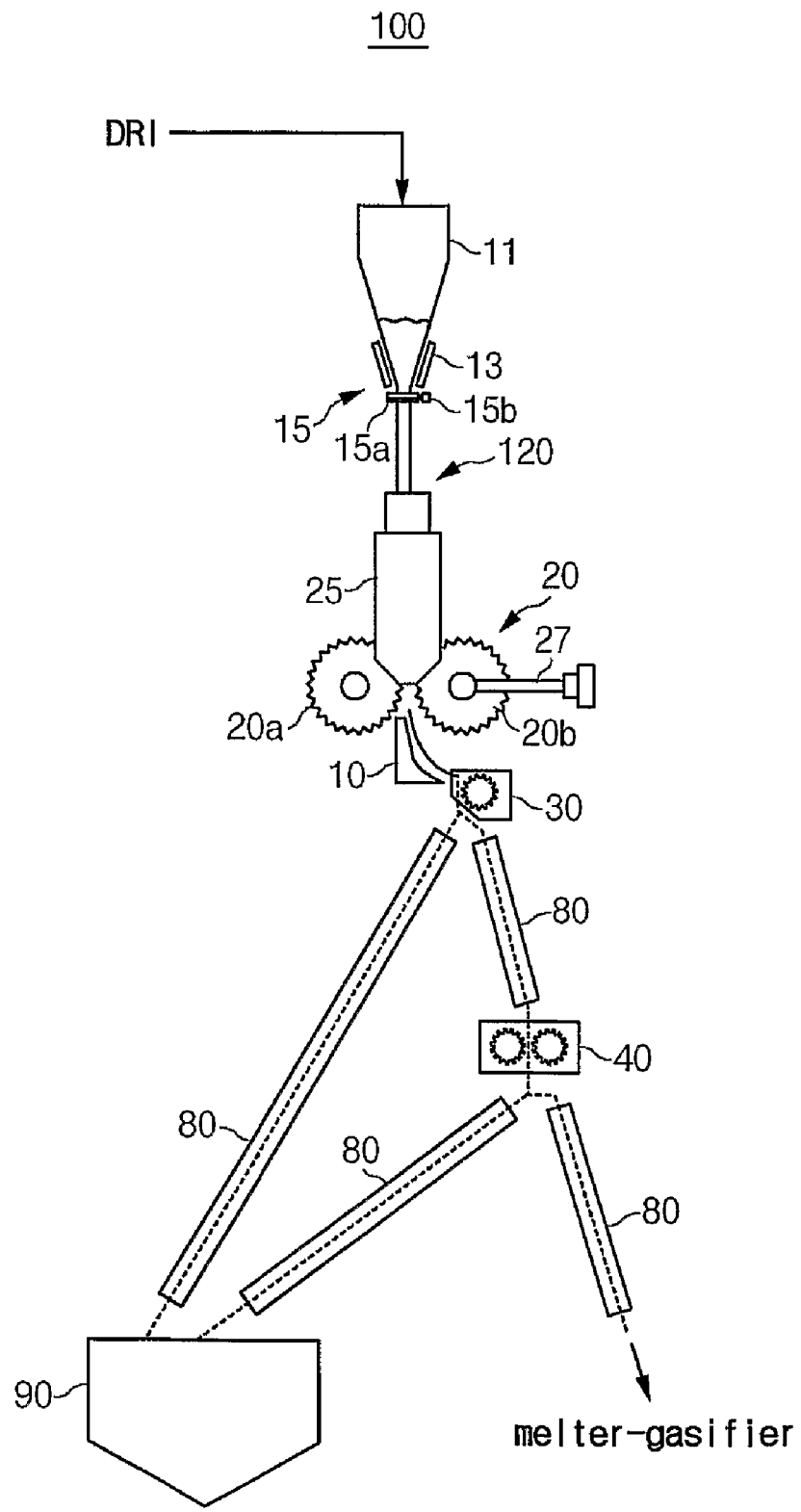
FIG. 1 schematically shows an apparatus for manufacturing compacted irons according to a first embodiment of the present invention.

FIG. 1 schematically shows an apparatus for manufacturing compacted irons according to an embodiment of the present invention. The apparatus for manufacturing compacted irons 100 compacts fine direct reduced irons and crushes them, and thereby manufacturing compacted irons. In particular, although fine reduced irons are only charged into a charging device 11, this is merely to illustrate the present invention and the present invention is not limited thereto. Therefore, it is possible to manufacture compacted irons by compacting and crushing the reduced materials containing fine reduced irons. The reduced materials containing fine reduced irons can further include additives for sintering the fine reduced irons.

The apparatus for manufacturing compacted irons 100 includes a charging device 11, a couple of rollers 20 and a transporting chute 80. In addition, the apparatus for manufacturing compacted irons 100 includes a level control device 13, an opening and shutting type valve 15, a charging hopper 25, a guide chute 10, a first crusher 30, and a second crusher 40.

The charging device 11 variably controls the amount of reduced materials containing fine reduced irons, and then supplies them to the couple of rollers 20. Since a large amount of the reduced materials containing fine reduced irons can be handled, it is possible to continuously manufacture a large amount of compacted irons.

The reduced materials containing fine reduced irons can be manufactured by passing a mixture of iron ores and additives through fluidized-bed reactors. The reduced materials containing fine reduced irons manufactured by using such a method are supplied to the charging device 11. The charging device 11 stores the reduced materials containing fine reduced irons of which the temperature is not less than 700° C. and a specific gravity thereof is about 2 ton/m$^3$. The reduced materials containing fine reduced irons can be pressurized and then transported to the charging device 11 since a discharging pressure in the final end of the fluidized-bed reactor is about 3 bar and flux thereof is about 3000 m$^3$/h.

It is possible to manufacture compacted irons by only using hot fine reduced irons without using additives. However, it is preferable that additives, of which the amount is 3 wt % to 20 wt % of the total amount, are mixed therein such that the hot fine reduced irons are not easily broken in the melter-gasifier.

The level control device 13 is installed under the charging device 11. The level control device 13 detects a level of the reduced materials containing fine reduced irons stored in the charging device 11. If the amount of the reduced materials containing fine reduced irons reaches a predetermined level, the level control device 13 blocks transportation of the reduced materials containing fine reduced irons from the fluidized-bed reactors or controls a transporting amount thereof.

In addition, the opening and shutting type valve 15 is installed under the charging device 11. The opening and shutting type valve 15 is provided with an opening and shutting plate 15a and a hydraulic actuator 15b. The opening and shutting plate 15a opens and closes a lower end of the charging device 11 and the hydraulic actuator 15b controls the opening and shutting plate 15a. The amount of the reduced materials containing fine reduced irons, which are charged into the charging hopper 25 from the charging device 11, is controlled by using the opening and shutting type valve 15.

The charging hopper 25 is located above a gap formed between the couple of rollers 20. The reduced materials containing fine reduced irons are charged into the gap formed between the couple of rollers 20 by the charging hopper 25. The reduced materials containing fine reduced irons are continuously charged by using the charging hopper 25, and thereby a large amount of compacted irons can be continuously manufactured by using the couple of rollers 20.

The couple of rollers 20 include two rollers 20a and 20b. The couple of rollers 20 compact the reduced materials containing fine reduced irons which are discharged from the charging hopper 25. The first roller 20a and the second roller 20b are rotated downward in opposite directions to each other. Therefore, the reduced materials containing fine reduced irons are compacted such that compacted irons can be continuously manufactured. In particular, the first roller 20a is fixedly installed and the second roller 20b is movably installed in order to prevent them from being out of order when a large amount of the reduced materials containing fine reduced irons are charged thereto. Therefore, an axis of the second roller 20b is supported by a hydraulic cylinder 27 etc. and the second roller 20b can be moved to the first roller 20a in a horizontal direction therewith. Hence, even if a large amount of the reduced materials containing fine reduced irons are charged thereto, compacted irons can be continuously manufactured since the second roller 20b can be elastically moved with respect to the first roller 20a.

The rollers 20 are operated while protrusions formed on the surface of the first roller 20a and protrusions formed on the surface of the second roller 20b cross each other. Therefore, it is possible to continuously manufacture compacted irons. When the compacted irons are manufactured by using this method, a volume along a width direction of the roller is increased, and thereby production efficiency is improved. The compacted irons manufactured by using the above method are guided into the guide chute 10 and are crushed in the first crusher 30. The guide chute 10 guides compacted irons manufactured by the couple of rollers 20 into the first crusher 30 while maintaining them in an unbroken state. For this, the guiding surface of the guide chute 10 includes a straight slanted surface and a curved slanted surface.

FIG. 1 shows two crushers including a first crusher 30 and a second crusher 40. Although two crushers are shown in FIG. 1, this is merely to illustrate the present invention and the present invention is not limited thereto. Therefore, it is possible to include a plurality of crushers. The crushers 30 and 40 crush compacted irons which are discharged from the couple of rollers 20. The second crusher 40 is connected to the first crusher 30 through a transporting chute 80.

The first crusher 30 coarsely crushes compacted irons. The compacted irons are crushed in order for the mean grain size thereof to be not more than 50 mm so that overload is not applied to a following device of the first crusher 30. The coarsely crushed compacted irons are transported to a dumping storage bin 90 or to the second crusher 40 through the transporting chute 80. When the melter-gasifier is not normally operated, compacted irons are transported to the dumping storage bin 90 through the transporting chute 80 since the compacted irons cannot be charged into the melter-gasifier. The dumping storage bin 90 temporarily stores the crushed compacted irons. When the melter-gasifier is normally operated, the first crusher 30 transports the compacted irons to the second crusher 40 through the transporting chute 80.

The second crusher 40 re-crushes the compacted irons by using a couple of crushing rollers, and thereby controlling a grain size distribution of the compacted irons. The compacted irons, which are re-crushed in the second crusher 40, are transported to the dumping storage bin 90 or to the melter-gasifier through the transporting chute 80. Although not shown in FIG. 1, a diverting damper is installed under the first crusher 30 and the second crusher 40, and thereby a transporting direction of the compacted irons can be chosen according to working conditions. Since the detailed structure of the diverting damper is obvious to those skilled in the art, a detailed description thereof is omitted.

The transporting chute 80 transports compacted irons discharged from the couple of rollers 20. The transporting chute 80 is a split chute, and a plurality of chutes are assembled in order by using flanges and screws. Therefore, it is easy to maintain the transporting chute 80.

The first crusher 30 or the second crusher 40 at an upper portion is connected to the dumping storage bin 90 or the melter-gasifier in a lower portion through the transporting chute 80. The transporting chute 80 is installed in an upper direction and a lower direction in order to transport the compacted irons, and is fixed by a spring hanger. It is possible for the transporting chute 80 to be installed to be slanted to a vertical direction.

Figure 2:
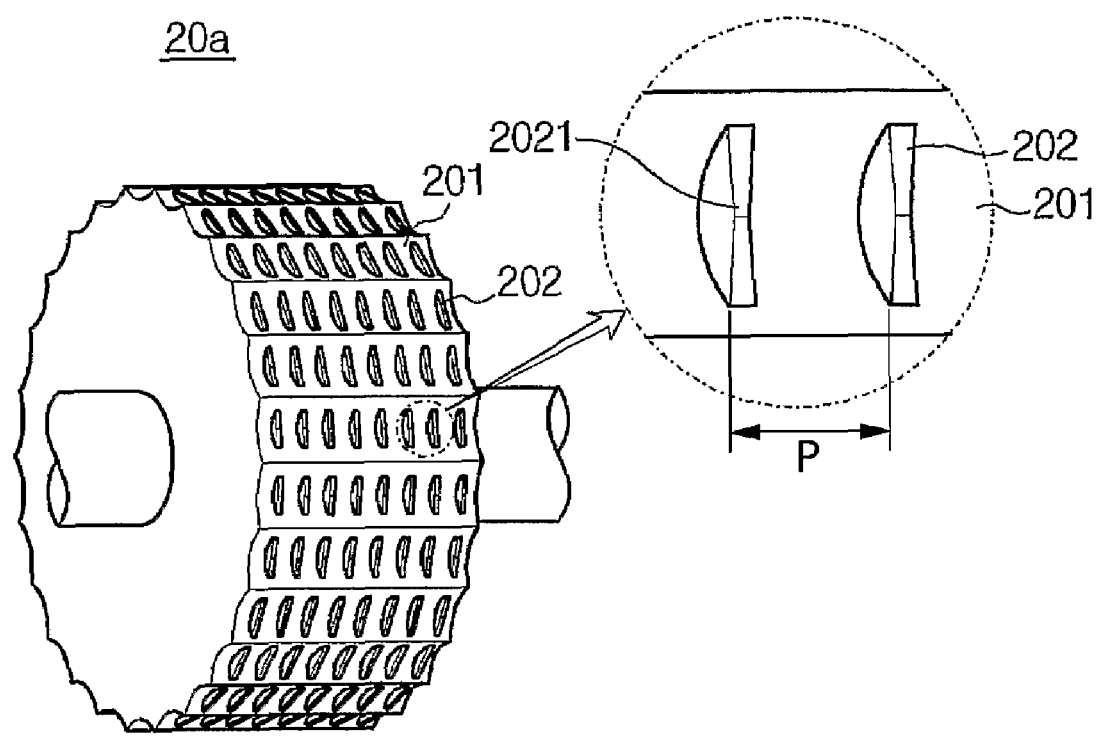
FIG. 2 schematically shows a roller provided in the apparatus for manufacturing compacted irons of FIG. 1.

FIG. 2 shows a magnification of the first roller 20a shown in FIG. 1 in detail. Although it is not shown in FIG. 2, a surface shape of the second roller 20b can be formed to be the same as that of the first roller 20a. Therefore, a surface shape of the first roller 20a, which is explained below, is not limited to the first roller 20a, but can also be applied to the second roller 20b.

As shown in FIG. 2, concave grooves 201 are continuously formed along an axis direction of the first roller 20a. A plurality of protruding portions 202 are formed on the concave grooves 201 to be separated from each other. The corrugation-shaped compacted irons can be manufactured by using a molding roller on which concave grooves 201 are formed and grooves can be formed on the surface of the corrugation-shaped compacted irons by using protruding portions 202. Since the grooves are formed on a surface of the corrugation-shaped compacted irons by using the protruding portions 202, it becomes easy to crush the corrugation-shaped compacted irons in a following process. Therefore, it is possible to improve crushing capacity and to minimize a particle ratio of the compacted irons.

As shown in the enlarged circle of FIG. 2, it is preferable that the protruded portions 202 are shaped as notches. The protruded portions 202 are protruded toward an outer direction of the first roller 20a. The protruded portions 202 are shaped as notches, and thereby forming grooves on a surface thereof while pressing fine reduced irons supplied from an upper direction. Therefore, it is easy to crush compacted irons in a first crusher which follows and is connected thereto. It is preferable that a thickness of the protruding portion 202 becomes shorter toward a center 2021 of the protruding portion in order to enhance a crushing effect in a following process. Therefore, a thickness of an edge portion of the protruding portion 202 is longer than that of a center 2021.

Accordingly, when the protruding portions 202 face the compacted irons, the protruding portions 202 can be more firmly supported, and thereby it is easy to form grooves.

It is preferable that a pitch between a plurality of protruding portions 202 formed on the concave grooves 201 is in a range of 16 mm to 45 mm. If the pitch is less than 16 mm, the compacted irons are not densified during transportation of compacted irons after compaction so a yield thereof is decreased. In addition, if the pitch is over 45 mm, an overload is applied to the first crusher and the second crusher. Therefore, the effect of crushing compacted irons is trivial. The corrugation-shaped compacted irons compacted by using the above-mentioned method are continuously supplied to the first crusher, and thereby compacted irons having a desired size can be obtained.

Figure 3:
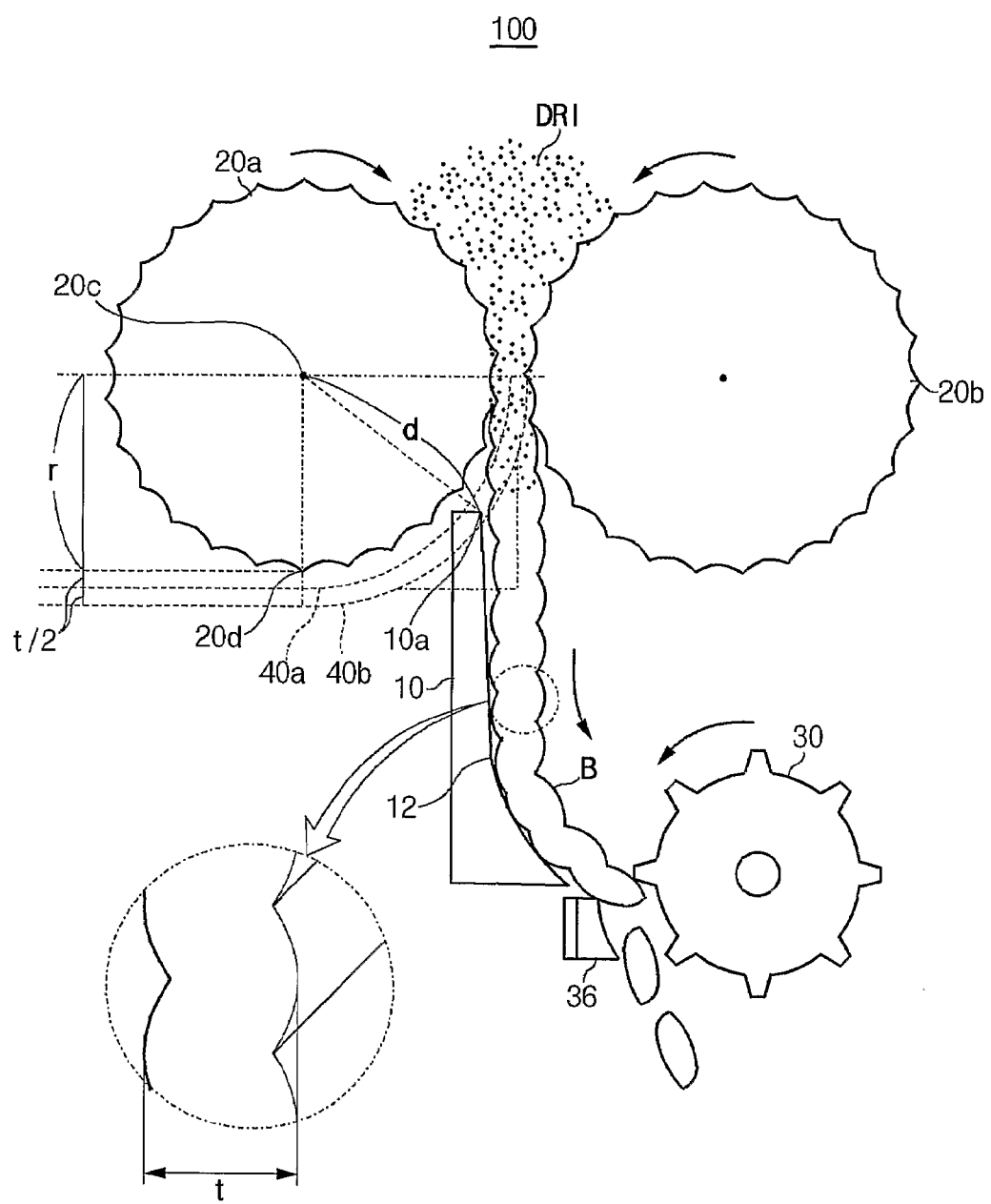
FIG. 3 is a partial front view of the apparatus for manufacturing compacted irons according to the first embodiment of the present invention.

FIG. 3 shows a magnifying state of the couple of rollers 20a and 20b, the guide chute 10 and the first crusher 30 in the apparatus for manufacturing compacted irons 100 shown in FIG. 1.

As shown in FIG. 3, the compacted irons B discharged from the couple of rollers 20a and 20b are guided by the guiding chute 10 and are charged into the first crusher 30. The upper end portion 10a of the guiding chute 10 is located at the end of the guiding surface 12. The upper end portion 10a is located to be nearer to the first roller 20a of the couple of rollers 20a and 20b. The second roller 20b is moved according to an amount of the fine reduced irons that has entered between the couple of rollers 20a and 20b. Therefore, when an upper end portion 10a of the guide chute 10 is located to be adjacent to the second roller 20b, the guide chute 10 and the second roller 20b can come in contact with each other as the second roller 20b is moved. Furthermore, the apparatus for manufacturing compacted irons 100 can be caused to be out of order. Therefore, the upper end portion 10a is located to be nearer to the first roller 20a than the second roller 20b. Since a location of the first roller 20a is not changed, an arrangement of the installations is more stable. Therefore, it is possible to continuously and stably work when compacted irons B are manufactured in the apparatus for manufacturing compacted irons 100.

In addition, it is preferable that the upper end portion 10a is located at a position which is not higher than a height of the center axis 20c of the first roller 20a and is not lower than a surface height of the lowest end portion 20d of the first roller 20a. By using this method, the guide chute 10 is adjacent to the surface of the first roller 20a. Therefore, the apparatus for manufacturing compacted irons 100 is prevented from being out of order which can occur in a case that the compacted irons B winds around the first roller 20a while sticking to the surface thereof.

The position of the guide chute 10, which prevents the compacted irons B from sticking to the surface of the fixed roller 20a will be explained more specifically below.

A first imaginary line 40a shown in FIG. 3 means a distance from a center 20c of the first roller 20a to a sum of the radius r of the first roller 20a and half 2/t of a mean thickness of the compacted irons B. The distance d means a distance from an upper end portion 10a of the guiding surface 12 of the guide chute 10 to a center 20c of the first roller 20a. It is preferable that the distance d is not less than sum of a radius r of the first roller 10a and half 2/t of a mean thickness of the compacted irons B. Namely, it is preferable that the upper end portion 10a of the guide chute 10 is located on the first imaginary line 40a or outside thereof. As shown in the enlarged circle of FIG. 3, the mean thickness t of the compacted irons B means a distance between bulged portions which cross each other based on a section of the compacted irons B.

As described above, the upper end portion 10a of the guide chute 10 is located to be adjacent to the first roller 20a, and a distance between the first roller 20a and the upper end portion 10a is maintained at about half t/2 of the mean thickness of the compacted irons B. Therefore, it is possible to prevent the compacted irons B from sticking to the surface of the first roller 20a and rising as the first roller 20a is rotated. Namely, the compacted irons B sticking to the surface of the first roller 20a cannot be raised, and are thereby caught by the guide chute 10 and directed to the crusher 30. When the guide chute 10 is arranged as above-mentioned, the compacted irons B are prevented from being attached to the first roller 20a. Therefore, it is not necessary for a lubricant to be coated on the first roller 20a or for a scraper to be installed in order for the compacted irons B not to be attached to the surface of the first roller 20a.

Meanwhile, a second imaginary line 40b shown in FIG. 3 means a distance from a center 20c of the first roller 20a to a sum of the radius r of the first roller 20a and a mean thickness t of the compacted irons B. It is preferable that the distance d is not more than a sum of a radius r of the first roller 20a and a mean thickness t of the compacted irons B. Namely, it is preferable that the upper end portion 10a of the guide chute 10 is located on the second imaginary line 40b or inside thereof. Therefore, the compacted irons B falls from the first roller 20a by the guide chute 10 and are directed to the guide chute 10 even if the compacted irons B winds on the first roller 20a. Therefore, it is possible to continuously manufacture the compacted irons B.

As described above, a position of the guide chute 10 is suitably arranged, and thereby the compacted irons B are prevented from winding on the couple of rollers 20a and 20b. In addition, it is possible for the compacted irons B to be smoothly supplied to the crusher 30 and crushed thereby.

Figure 4:
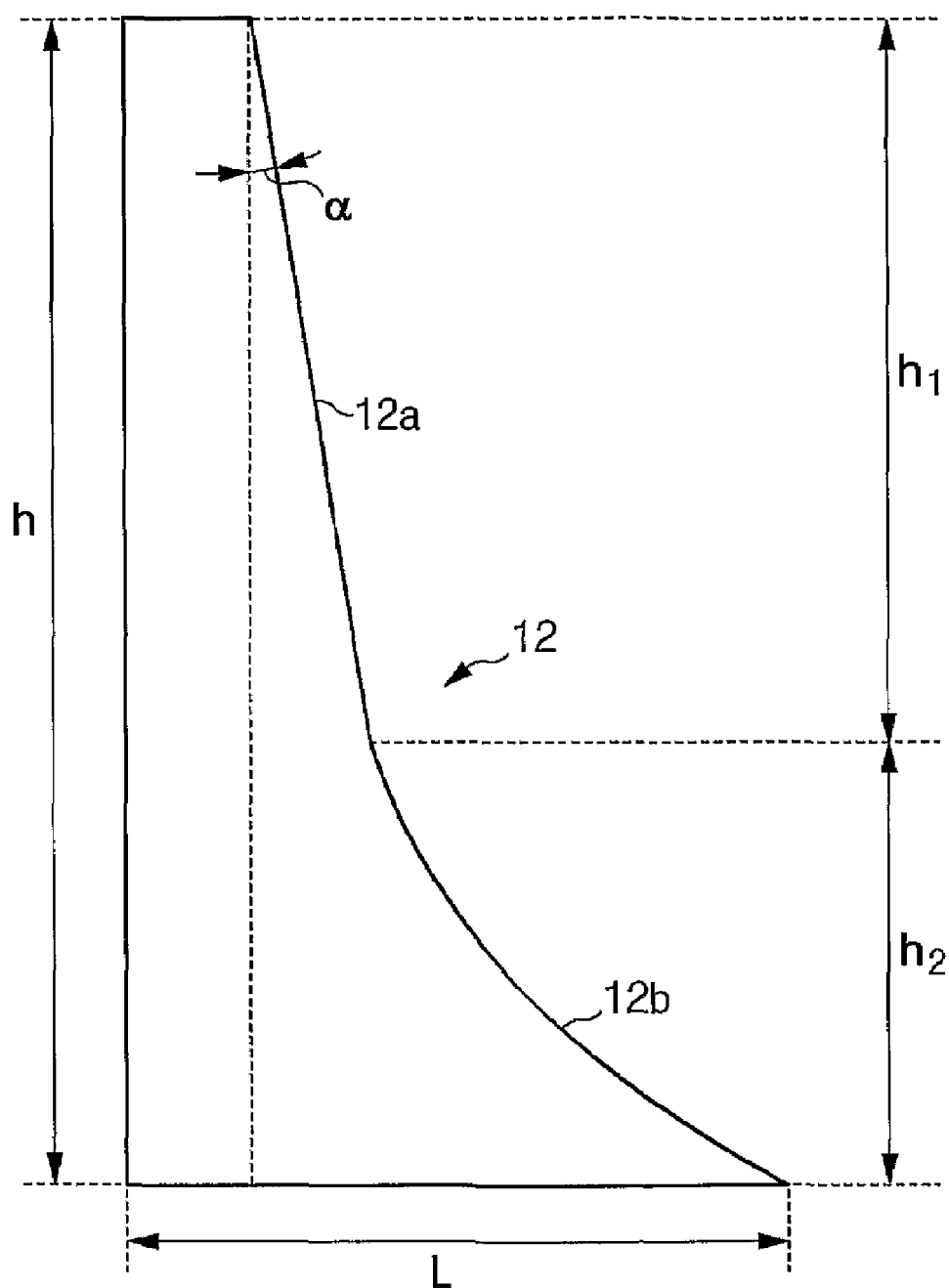
FIG. 4 is a front view of a guide chute provided in the apparatus for manufacturing compacted irons of FIG. 1.

FIG. 4 shows a magnification of the guide chute 10 shown in FIG. 1. The guide chute 10 can be manufactured with processing materials such as a stainless steel etc.

The guide chute 10 is provided with a guiding surface 12 which guides the compacted irons B. The guiding surface 12 includes a straight slanted surface 12a and a curved slanted surface 12b. Although the upper portion of the guiding surface 12 of the guide chute 10 is formed as a straight slanted surface 12a, and the lower portion of the guiding surface 12 is formed as a curved slanted surface 12b, this is merely to illustrate the present invention and the present invention is not limited thereto. Therefore, the guiding surface 12 of the guide chute 10 can be formed differently.

The compacted irons B smoothly enters into the guide chute 10 at a uniform speed due to the straight slanted surface 12a. Therefore, the compacted irons B are stably and continuously guided into the crusher 30. In addition, the speed of the compacted irons B falling from above, which enters into the crusher 30, is more or less decreased due to the curved slanted surface 12b. Therefore, impact at the time that the compacted irons are crushed is minimized, and thereby the compacted irons, which are crushed in a shape of a plate, are continuously discharged.

When the compacted irons are crushed by using the above-mentioned method, it is possible to absorb an impact delivered by uncrushed compacted irons. Therefore, since the compacted irons are continuously discharged, the fine particles are prevented from discharging when the compacted irons are broken. Accordingly, a thermal load to a following installation is decreased, and thereby the installation is stabilized.

It is preferable that a ratio of a height $h_1$ of the upper portion 12a of the guiding surface to a height $h_2$ of the lower portion 12b of the guiding surface is in a range of 5.0 to 6.0. The ratio of $h_1$ to $h_2$ is controlled in the above-mentioned range so that a speed of the compacted irons entering into the guide chute 10 is suitably maintained. In addition, the compacted irons are supplied to the crusher and then well-crushed compacted irons are continuously supplied therefrom.

The slanted angle α means an angle between a straight slanted surface 12a of the guide chute 10 and a vertical direction. It is preferable that the angle α is in a range of 6 degrees to 8 degrees. The compacted irons can continuously enter into the crusher at a uniform speed if the slanted angle α is in a range of 6 degrees to 8 degrees. In particular, if the angle α is substantially 7 degrees, the compacted irons enter at the most uniform speed. Here, the phrase that the slanted angle α is substantially 7 degrees means that the slanted angle α is 7 degrees or is near 7 degrees.

If the slanted angle α is less than 6 degrees, stress applied to the curved slanted surface 12b is increased although the internal stress of the compacted irons is decreased while they are advanced in a state of being pressed. In addition, if the slanted angle α is over 8 degrees, the compacted irons are broken due to a high stress which is applied where the compacted irons are just discharged from the rollers. Therefore, it is impossible to continuously charge compacted irons into the crusher.

It is preferable that a radius of curvature of the curved slanted surface 12b is in a range of 1700 mm to 1900 mm. If the radius of curvature of the curved slanted surface 12b is in a range of 1700 mm to 1900 mm, the compacted irons can be continuously charged into the crusher without being broken. In particular, when the radius of curvature of the curved slanted surface 12b is substantially 1800 mm, the compacted irons can be continuously charged into the crusher without being broken.

If the radius of curvature of the curved slanted surface 12b is less than 1700 mm, since the curved slanted surface 12b is radically bent, much stress is applied to the compacted irons which are charged into the crusher. Therefore, a middle portion of the compacted irons is broken. In addition, if the radius of curvature of the curved slanted surface 12b is over 1900 mm, an inclination of the curved slanted surface 12b becomes too little and it becomes near a straight line. Therefore, transporting speed of the compacted irons which are charged into the crusher is increased, and thereby a large load is applied to the crusher.

It is preferable that a ratio of height h of the guide chute 10 to a length L of a base line of the guide chute 10 is in a range of 1.0 to 2.0. By manufacturing the guide chute 10 as in the above-mentioned design, the guide chute 10 can be suitably arranged in the middle of the couple of rollers and the crusher. In addition, the compacted irons entering into the guide chute 10 from above can be smoothly and continuously supplied to the crusher.

By using the guide chute 10 having the above-mentioned structure, it is possible that the compacted irons are smoothly guided into the crusher and an impact that is delivered from the crusher by the uncrushed compacted irons, is absorbed. Therefore, the compacted irons are smoothly discharged from the guide chute 10, and thereby preventing fine unshaped particles, which are generated when the compacted irons are continuously discharged from the guide chute 10 and are broken, from being discharged. It is therefore possible for a thermal load to the following installation such as a crusher to be reduced and the installation to be stabilized.

Figure 5:
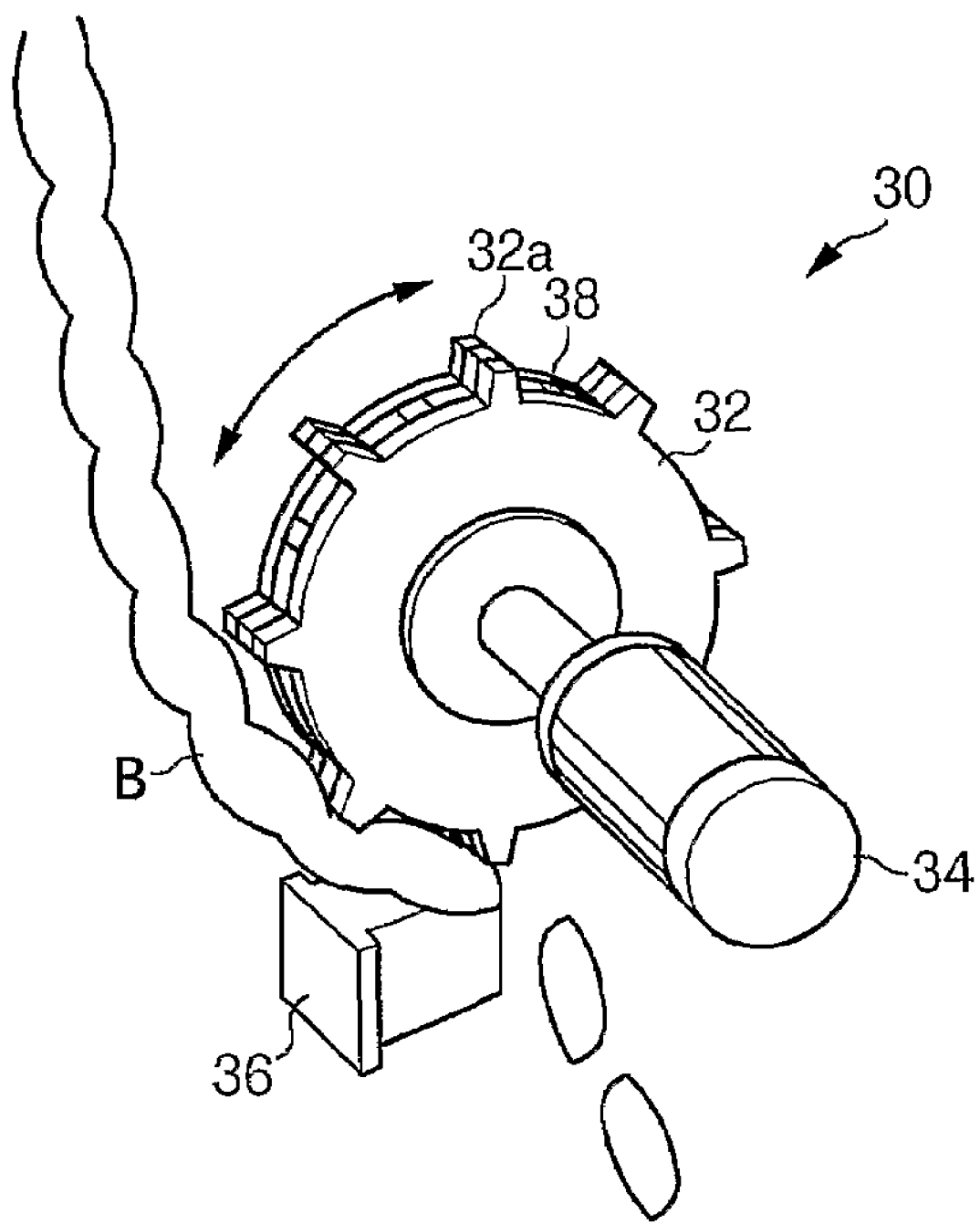
FIG. 5 schematically shows a first crusher provided in the apparatus for manufacturing compacted irons of FIG. 1.

FIG. 5 shows a magnification view of the first crusher 30 of FIG. 1. The first crusher 30 includes a plurality of crushing plates 32 and a space ring 38 inserted therebetween. A plurality of protrusions 32a, which are separated from each other, are formed on a circumference of the crushing plate 32. A plurality of crushing plates 32 are arranged side by side along the same axis and are operated together. The space ring 38 controls the space between the crushers 32. As shown in FIG. 5, a rotating axis 34 of the crushing plate 32 is connected to a driving means, and thereby the crushing plates 32 can be rotated together. The compacted irons are coarsely crushed by using the plurality of protrusions 32a as the crushing plate 32 is operated. A support 36 is installed under the first crusher 30 for crushing. The compacted irons B are guided into the support 36 and are supported. The compacted irons B are coarsely crushed by an impact from an inertial force of the protrusions 32a of the crushing plate 32 which is rotated in a direction indicated by an arrow.

Figure 6:
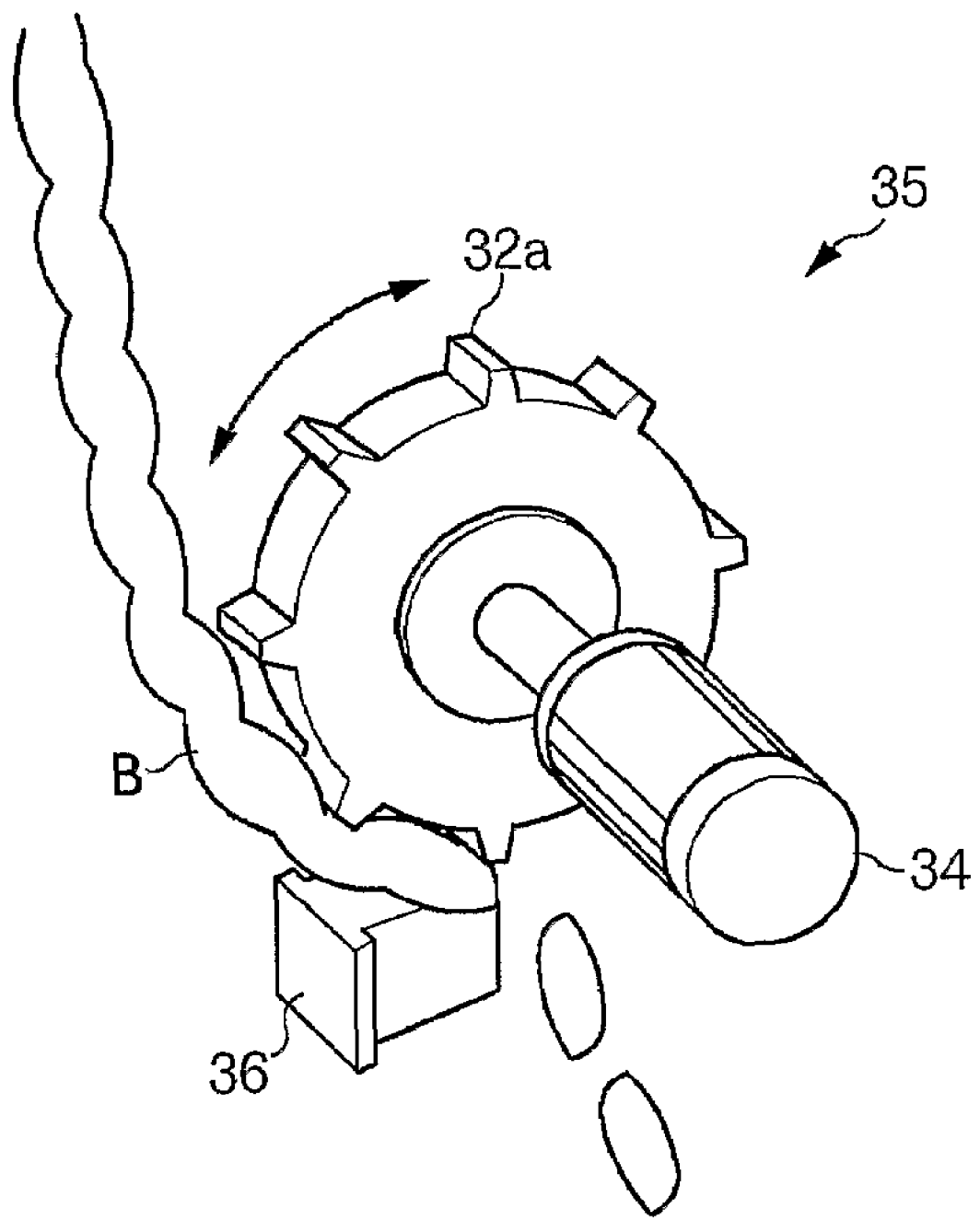
FIG. 6 schematically shows a second crusher provided in the apparatus for manufacturing compacted irons according to a second embodiment of the present invention.

FIG. 6 shows another first crusher 35 provided in an apparatus for manufacturing compacted irons according to a second embodiment of the present invention. The first crusher 35 includes an integrated body. Since the first crusher 35 is similar to the first crusher provided in the apparatus for manufacturing compacted irons according to the first embodiment of the present invention shown in FIG. 5, the same elements are referred to by the same reference numerals and a detailed description thereof is omitted.

As shown in FIG. 6, a plurality of protrusions 32a, which are separated from each other, are formed on the circumference of the first crusher 35. Therefore, the compacted irons B are coarsely crushed by using the plurality of protrusions 32a as the first crusher 35 is operated. Since the first crusher 35 includes an integrated body, it is easy to repair and maintain it, and it gets little damage during crushing.

Figure 7:
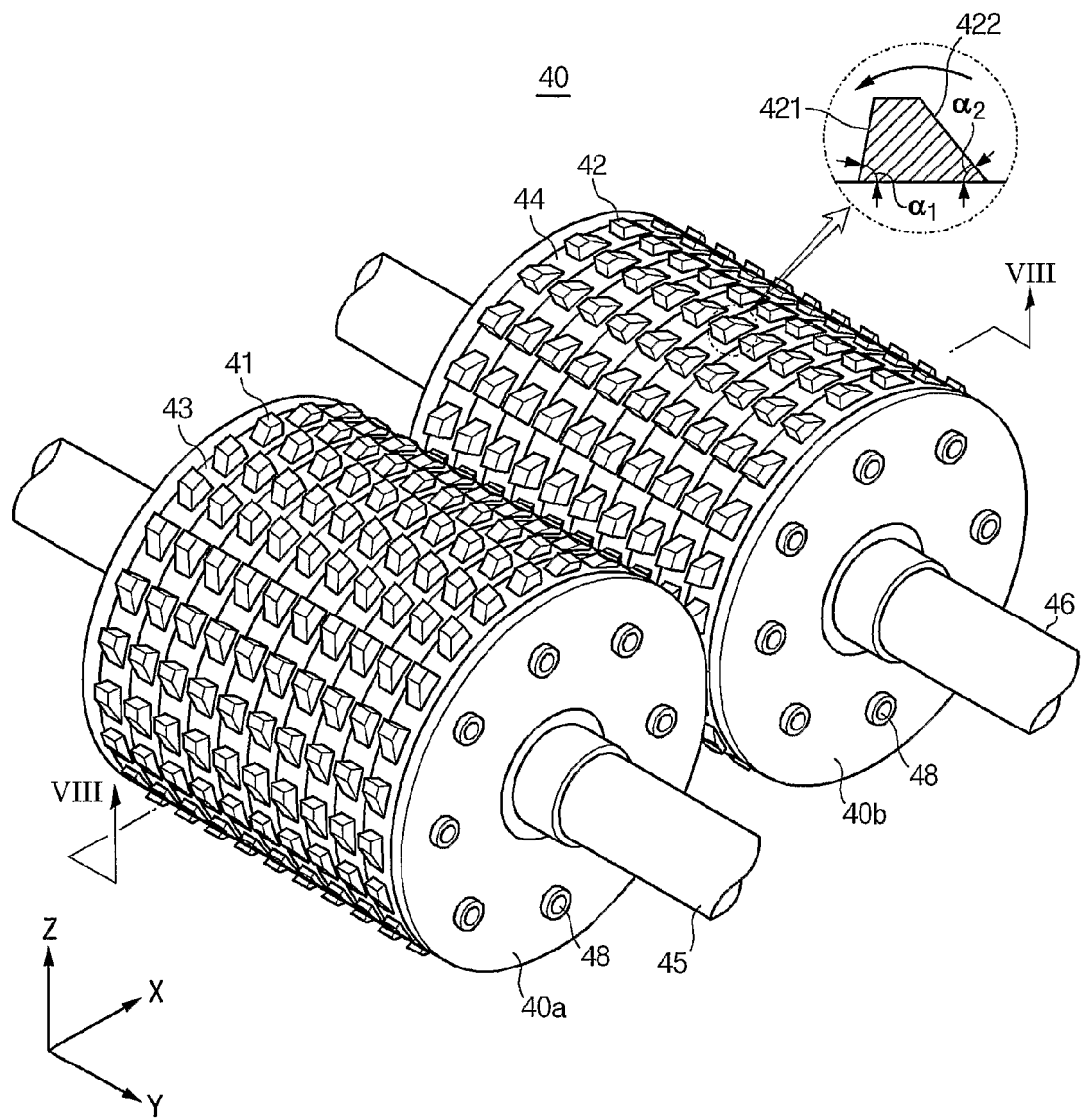
FIG. 7 schematically shows a second crusher provided in the apparatus for manufacturing compacted irons of FIG. 1.

FIG. 7 shows a second crusher 40 shown in FIG. 1 in detail. The second crusher 40 includes a couple of crushing rollers 40a and 40b which are installed to be separated from each other.

The couple of crushing rollers 40a and 40b includes a plurality of crushing disks 43 and 44 which are installed in a Y-direction (axis direction), respectively. A plurality of blades 41 and 42 are formed on a circumference of the crushing disks 43 and 44, respectively. After the plurality of crushing disks 43 and 44 are inserted into each of an axis 45 and 46, they are combined with a plurality of tie bolts 48 which are inserted. After a driving means such as a hydraulic motor is connected to each of the axis 45 and 46, a couple of crushing rollers 40a and 40b are operated in opposite directions to each other. Therefore, it is possible to smoothly secure permeability of gas in the melter-gasifier since coarsely crushed compacted irons, which are charged from above, can be re-crushed into a desired size.

The blades 41 and 42 are formed to be a shape which is suitable for more effectively crushing in the second crusher 40. The enlarged circle of FIG. 7 shows a state in which the blade 42 formed on the right-hand crushing roller 40b is seen in the Y-axis direction, and an arrow shows a rotating direction of the right-hand crushing roller 40b. The blade 41 formed on the left-hand crushing roller 40a is formed to be symmetrical to the blade 42 formed on the right-hand crushing roller 40b in left and right directions so that the crushing is effectively carried out.

As shown in the enlarged circle of FIG. 7, the blade 42 includes a first slanted surface 421 and a second slanted surface 422. The first slanted surface 421 is directed to a rotating direction of the right crushing roller 40b, and the second slanted surface 422 is directed to an opposite rotating direction of the right-hand crushing roller 40b. Here, the first slanted angle $\alpha_1$ is larger than the second slanted angle $\alpha_2$. The first slanted angle $\alpha_1$ is an angle which is made by the first slanted surface 421 and a circumference of the right crushing roller 40b, while the second slanted angle $\alpha_2$ is an angle which is made by the second slanted surface 422 and a circumference of the right crushing roller 40b.

Considering that the compacted irons are crushed by letting the first slanted surface 421 directly come in contact with the compacted irons, the first slanted angle $\alpha_1$ is formed to be a radically slanted angle. Namely, it is formed to be near a right angle. Therefore, the compacted irons can be effectively crushed. Here, it is preferable that the first slanted angle $\alpha_1$ is in a range of 80 degrees to 90 degrees. If the first slanted angle $\alpha_1$ is less than 80 degrees or above 90 degrees, the compacted irons are not crushed well.

Meanwhile, it is preferable that the second slanted angle $\alpha_2$ is formed to be a shallow slant in order to support the blade 42 during crushing, thereby minimizing an impact which is delivered to the blade 42 when the compacted irons are crushed by the blade 42. Therefore, a durability of the crushing roller 40b can be increased. Here, it is preferable that the second slanted angle $\alpha_2$ is in a range of 40 degrees to 50 degrees. If the second slanted angle $\alpha_2$ is less than 40 degrees, it is impossible to manufacture the crushing roller 40b since the width of the blade 42 is enlarged. In addition, if the second slanted angle $\alpha_2$ is over 50 degrees, a supporting effect of the blade 42 is trivial.

Figure 8:
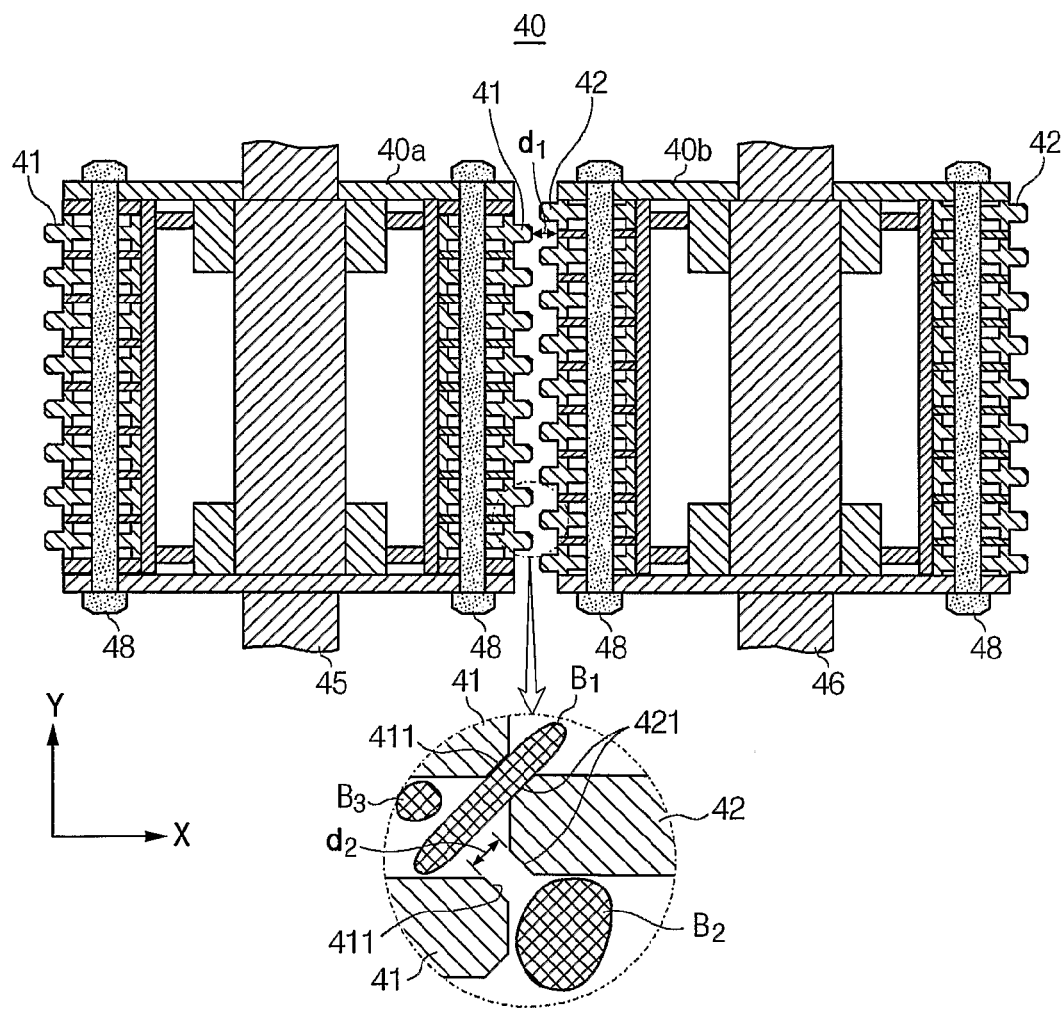
FIG. 8 is a sectional view along a line VIII-VIII of FIG. 7.

FIG. 8 shows a section along a line VIII-VIII of FIG. 7, and FIG. 8 schematically shows a sectional structure of the second crusher 40.

Among the couple of crushing rollers 40a and 40b shown in FIG. 8, one crushing roller is a fixed roller and the other crushing roller is a moving roller. The moving roller can be shifted in a horizontal direction since both ends of the axis of the moving roller are supported by a spring shock-absorbing device (not shown). Therefore, a gap between the couple of crushing rollers 40a and 40b can be variably controlled in compliance with the amount of compacted irons charged thereto. In addition, when the couple of crushing rollers 40a and 40b are rotated by a hydraulic motor, a rotating speed of the couple of crushing rollers 40a and 40b is controlled by an amount of oil supplied to the hydraulic motor, and thereby manufacturing the compacted irons with a suitable grain size distribution. Therefore, a gap between the couple of crushing rollers 40a and 40b is variably controlled in compliance with the amount of the compacted irons which are charged from above, and thereby work can be elastically controlled.

With regard to the couple of rollers 40a and 40b shown in FIG. 8, it is preferable that a plurality of the first blades 41 face a space formed between a plurality of the second blades 42. Here, it is preferable that a distance $d_1$ from an end portion of the first blade 41 to a surface of the second crushing roller 40b facing the end portion of the first blade 41, is in a range of 10 mm to 20 mm. If the distance $d_1$ is less than 10 mm, the blades 41 and 42 come into contact with each other and can be damaged since the crushing rollers 40a and 40b are too close. Meanwhile, if the distance $d_1$ is less than 20 mm, the compacted irons are not substantially crushed considering a thickness of the compacted irons.

Since each of a gap between a plurality of the first blades 41 is the same as each of the gaps between a plurality of the second blades 42, the second blade 42 faces a space formed between the first blades 41. Therefore, it is preferable that a distance from an end portion of the second blade 42 to a surface of the first crushing roller 40a facing the end portion of the second blade 42, is in a range of 10 mm to 20 mm. The grain size distribution of the compacted irons is controllably crushed to be a desired grain size distribution by rotating each of the blades 41 and 42.

The enlarged circle of FIG. 8 schematically shows a crushing state of compacted irons which are inserted between each of the blades 41 and 42 of the second crusher 40. As shown in the enlarged circle of FIG. 8, the end portions 411 and 421 of each of the blades 41 and 42 are chamfered. Therefore, the compacted irons charged from above can be crushed and discharged well downward. In particular, a chamfered surface 411 formed on the end portion of the first blade 41 and a chamfered surface 432 formed on the end portion of the second blade 42, which is nearest to the chamfered surface 411, face each other. Therefore, crushed compacted irons are more smoothly discharged between each of the chamfered surfaces 411 and 421. Here, the distance between the chamfered surfaces 411 and 421 is preferably in a range of 10 mm to 15 mm. If a distance between the chamfered surfaces 411 and 421 is less than 10 mm, the compacted irons charged from above are not discharged well. Meanwhile, if a distance between the chamfered surfaces 411 and 421 is above 15 mm, uncrushed compacted irons are discharged.

As shown in the enlarged circle of FIG. 8, compacted irons $B_1$ with a grain size in a range of 20 mm to 30 mm can be passed between both of the chamfered surfaces 411 and 421. In addition, compacted iron $B_2$ with a grain size in a range of 5 mm to 20 mm can be passed through a space formed by the first blade 41 and the second blade 42. Furthermore, compacted iron $B_3$ with a grain size of less than 5 mm can be passed between the first blades 41 and between the second blades 42 as the above-mentioned compacted irons $B_1$ and $B_2$ are crushed. Therefore, compacted irons with a suitable grain size distribution are manufactured and are supplied to the melter-gasifier, and thereby a permeability of gas in the melter-gasifier is optimized.

Figure 9:
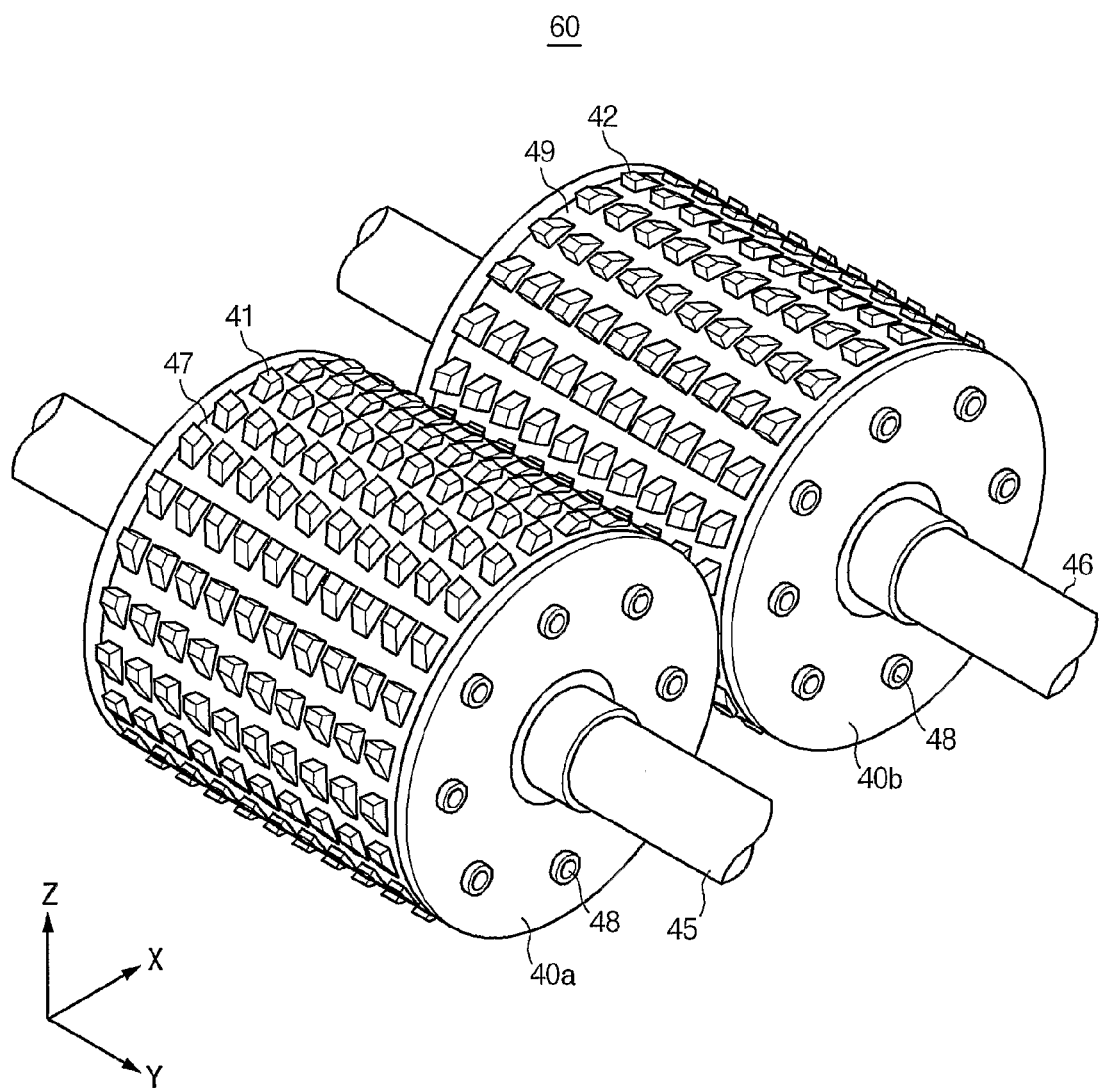
FIG. 9 schematically shows a second crusher provided in the apparatus for manufacturing compacted irons according to a third embodiment of the present invention.

FIG. 9 shows another second crusher 60 provided in an apparatus for manufacturing compacted irons according to the third embodiment of the present invention. Since the second crusher 60 shown in FIG. 9 is similar to the second crusher provided in the apparatus for manufacturing compacted irons according to the first embodiment, the same elements are referred to with the same reference numerals and the detailed description thereof is omitted.

The second crusher 60 includes a couple of crushing rollers 40a and 40b which are not separated into a disk type and they include integrated bodies 47 and 49. Since a plurality of blades 41 and 42 are formed on a circumference of the couple of crushing rollers 40a and 40b, coarsely crushed compacted irons are re-crushed by operating the couple of crushing rollers 40a and 40b in opposite directions to each other. Since the second crusher 60 includes an integrated body, it is easy to repair and maintain it, and it gets little damage during crushing.

Figure 10:
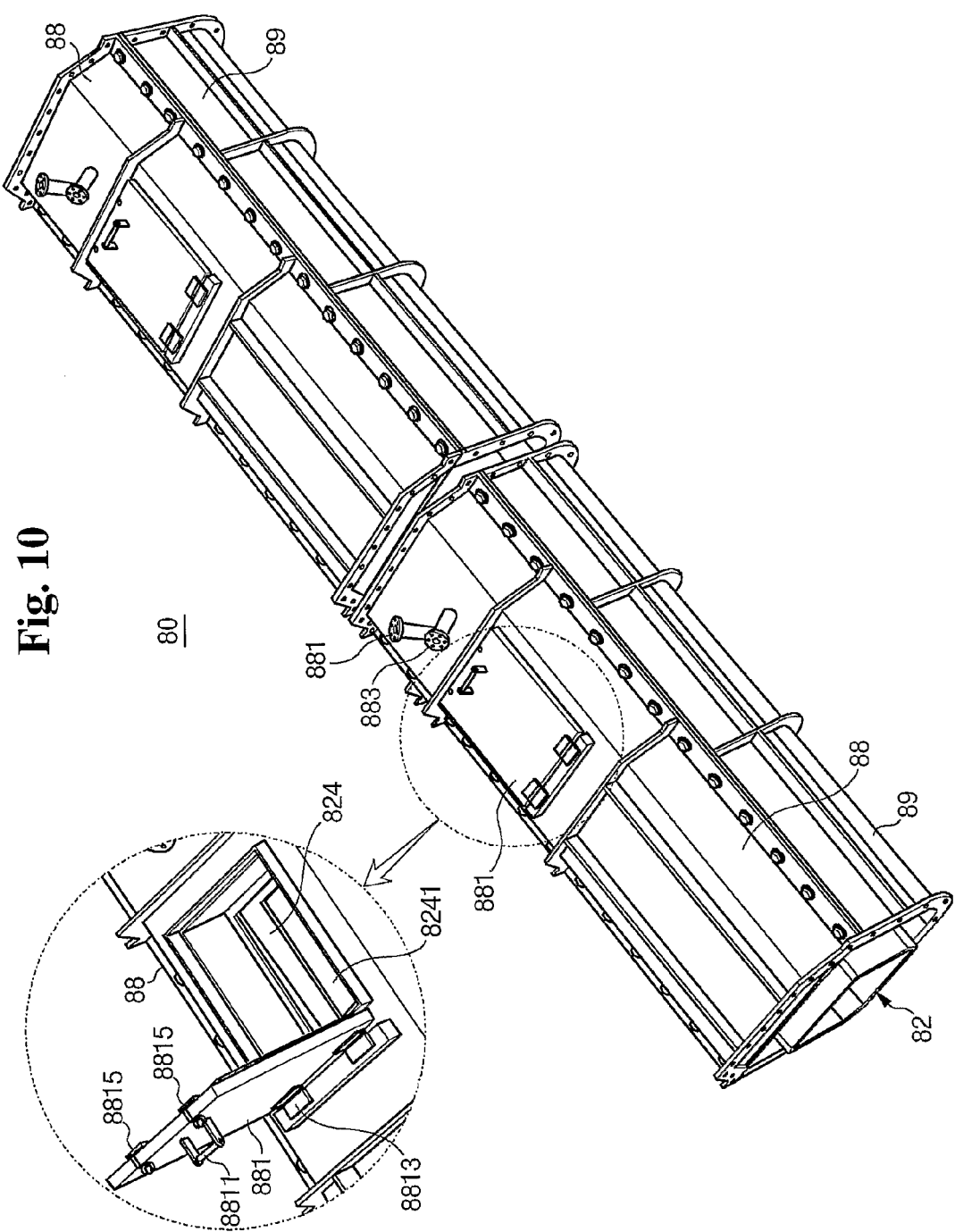
FIG. 10 is a perspective view of a transporting chute provided in the apparatus for manufacturing compacted irons of FIG. 1.

FIG. 10 shows a magnification of the transporting chute 80 shown in FIG. 1. The enlarged circle of FIG. 10 shows a state of opening a manhole 881 which is attached to an external cover 88.

As shown in FIG. 10, the transporting chute 80 includes a plurality of external casings 89 and a plurality of external covers 88. In addition, it can further include a compensator, a sampler, a slide gate, a common chute, etc., as necessary. The external covers 88 are respectively attached to the external casings 89, and the external casings 89 are assembled to the external covers 88 with screws. Flanges are installed at both ends of the assembly of the external casing 89 and the external cover 88, and thereby the assemblies can be connected to each other over a long distance, and the transporting chute 80 can be firmly assembled.

A plurality of linear chutes 82 are received in a plurality of external casings 89. The external casings 89 allow the linear chutes 82 to be separated from outside for repair. Further, the linear chutes 82 can be firmly fixed.

The external covers 88 are formed to be bent in order for the section thereof to be shaped as a trapezoid. Therefore, it is possible to prevent the reduced materials containing fine reduced irons, which are transported through the transporting chute 80, from leaking outside. The manhole 881 and a plurality of $N_2$ purge connecting parts 881 and 883 can be installed on the external cover 88. The manhole 881 faces an opening 8241 which is formed on the linear chute cover 824.

Therefore, it is possible to check the behavior of the reduced materials containing fine reduced irons inside of the linear chute 82 by opening the manhole 881. In particular, it is possible to previously prevent it from being out of order since a wear state of the linear chute 82 can also be observed. Since a handle 8811 and a hinge 8813 are attached to the manhole 881, the manhole 881 can be easily opened and closed. Since the manhole 881 is firmly assembled with a butterfly bolt 8815, the reduced materials containing fine reduced irons are not easily scattered outside.

A plurality of $N_2$ purge connecting parts 881 and 883 are connected to the external cover 88. When the transporting chute 80 is blocked, $N_2$ is purged through the $N_2$ purge connecting parts 881 and 883, and thereby penetrating the transporting chute 80. The $N_2$ purge connecting parts 881 and 883 includes a first $N_2$ purge connecting part 881 and a second $N_2$ purge connecting part 883. The first $N_2$ purge connecting part 881 is installed to be slanted toward a lower portion of the transporting chute 80. On the contrary, the second $N_2$ purge connecting part 883 is installed to be slanted toward an upper portion of the transporting chute 80. Accordingly, it is possible that $N_2$ is uniformly purged in an upper direction and a lower direction of the transporting chute 80.

Figure 11:
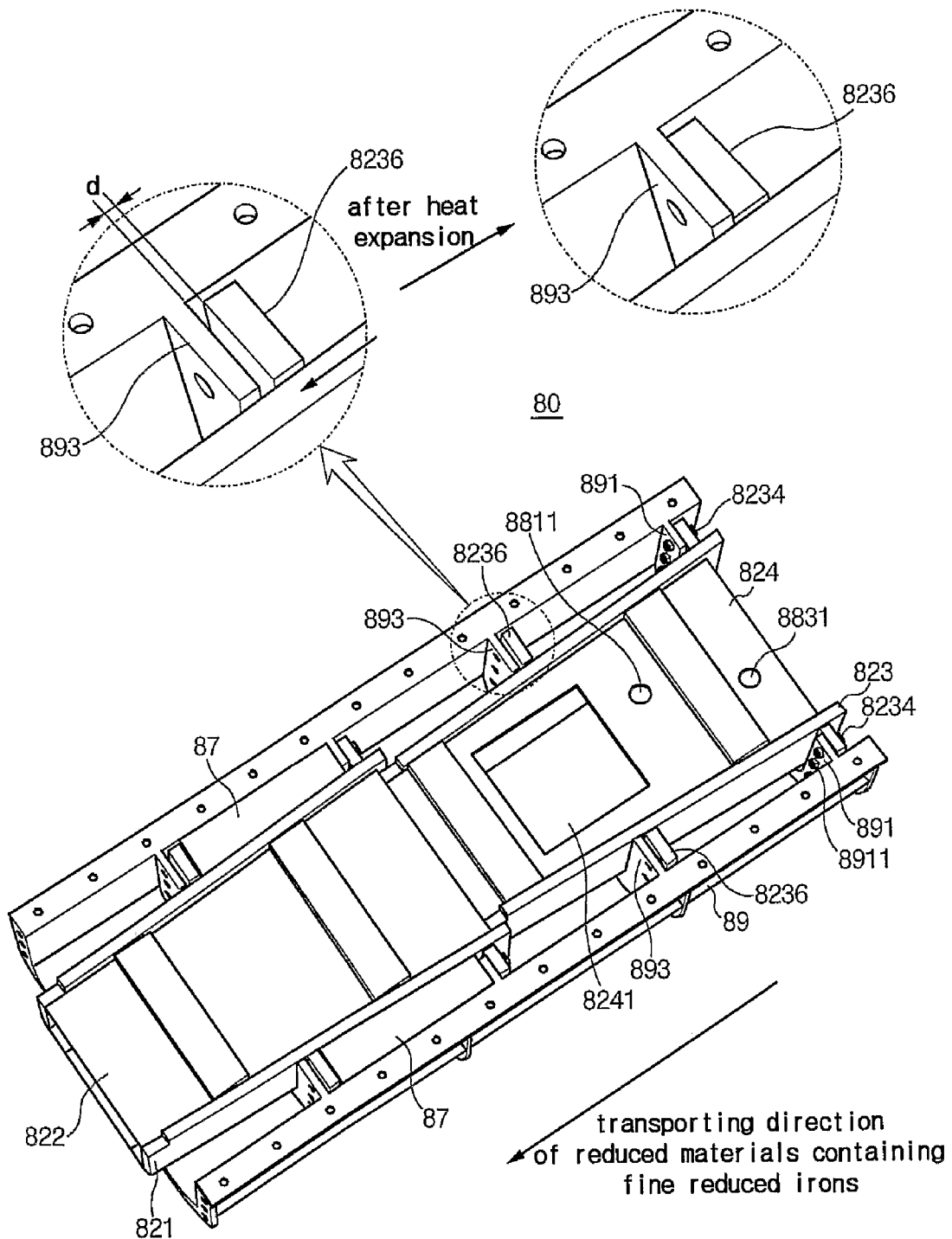
FIG. 11 shows a state of removing an external cover from the transporting chute of FIG. 10.

FIG. 11 shows a state of removing the external cover 88 from the transporting chute 80 shown in FIG. 10. As shown in FIG. 11, two linear chutes 821 and 823 are installed in one external casing 89. The linear chutes 821 and 823 are connected to each other. Since two linear chutes 821 and 823 are assembled to correspond to one external casing 89, the entire structure thereof is not complex but is simple.

The linear chutes 821 and 823 include a first linear chute 821 and a second linear chute 823. Since a size of the first linear chutes 821 is the same as that of the second linear chutes 823, it is possible to manufacture a large amount of linear chutes and use them. With regard to the linear chutes 821 and 823, the second linear chute 823 and the first linear chute 821 are repeatedly arranged in order along the transporting direction of the reduced materials containing fine reduced irons indicated by an arrow. The specific shape and a connecting structure of the linear chutes 821 and 823 will be specifically explained with reference to the following FIG. 12.

The linear chute covers 822 and 824 are respectively attached to the linear chutes 821 and 823. The linear chute covers 822 and 824 prevent dust and heat from diffusing by closing off the linear chutes 821 and 823. Therefore, the linear chute covers 822 and 824 can prevent the reduced materials containing fine reduced irons passing through the linear chutes 821 and 823 from discharging outside of the transporting chute 80. The linear chute covers 822 and 824 include a first linear chute cover 822 and a second linear chute cover 824. The opening 8241 is formed on the second linear chute cover 824 and faces the manhole 881. In addition, other openings 8811 and 8831 are formed in order for each of the $N_2$ purge connecting parts 881 and 883 to be inserted into the transporting chute 80. The opening 8811 corresponds to the $N_2$ purge connecting part 881 and the opening 8831 corresponds to the $N_2$ purge connecting part 883. Therefore, $N_2$ in the transporting chute 80 can be effectively purged.

Lagging materials 87 are filled between the external casing 89 and the linear chutes 821 and 823, and thereby preventing heat in the transporting chute 80 from diffusing. Although the lagging materials 87 are shown to be partly filled in FIG. 11 for convenience, it is possible to fill the lagging materials 87 in all areas between the external casing 89 and the linear chutes 821 and 823.

A couple of brackets 8234 and 8236 are attached to side portions of the second linear chute 823 side by side along the transporting direction of the reduced materials containing fine reduced irons. The couple of the brackets 8234 and 8236 are fixed in a plurality of fixing portions 891 and 893 which are formed in the external casing 89. A plurality of fixing portions 891 and 893 prevent the second linear chute 823 from sinking and reinforce the strength of the transporting chute 80. The first linear chute 821 is the same as the above case.

The couple of brackets 8234 and 8236 include a first bracket 8234 and a second bracket 8236. The first bracket 8234 and the second bracket 8236 are attached in order from above to below along the transporting direction of the reduced materials containing fine reduced irons. Since the second linear chute 823 is fixed by using the couple of brackets 8234 and 8236, it is possible to fix both an upper portion and a lower portion of the second liner chute 823. Thereby, the second linear chute 823 is firmly fixed.

The plurality of fixing portions 891 and 893 include a first fixing portion 891 and a second fixing portion 893. The first fixing portion 891 is separated from the second fixing portion 893. Since the first bracket 8234 is assembled with the first fixing portion 891 with screws, the external casing 89 firmly fixes the second linear chute 823. On the contrary, the second fixing portion 893 is fixedly separated from the second bracket 8236. This is shown in the left enlarged circle of FIG. 11.

As shown in the left enlarged circle of FIG. 11, the second fixing portion 893 is fixedly separated from the second bracket 8236. When the apparatus for manufacturing compacted irons are operated, heat is applied to the second linear chute 823 which directly comes in contact with hot reduced materials containing fine reduced irons since the hot reduced materials containing fine reduced irons are transported through the transporting chute 80. Therefore, the second linear chute 823 is thermally expanded in a direction indicated by an arrow.

As shown in the right enlarged circle of FIG. 11, the second bracket 8236 comes in contact with the second fixing portion 893 if the second linear chute 823 is thermally expanded. When heat has not been applied, the transporting chute 80 is prevented from being damaged due to thermal deformation since the second fixing portion 893 does not come in contact with the second bracket 8236 and is fixed.

The separating distance d shown in the left enlarged circle of FIG. 11 is established by considering a thermal expansion ratio α of the second linear chute 823, a length I of the second linear chute 823, and a rising temperature ΔT. Namely, if a thermal expansion ratio α of the second linear chute 823 is denoted as α, a length of the second linear chute 823 is denoted as I, and rising temperature is denoted as ΔT, the following Formula 1 is produced.

$$d = \alpha \times I \times \Delta T \qquad \text{[Formula 1]}$$

Therefore, a separating distance d is established with reference to the above-mentioned Formula 1.

Figure 12:
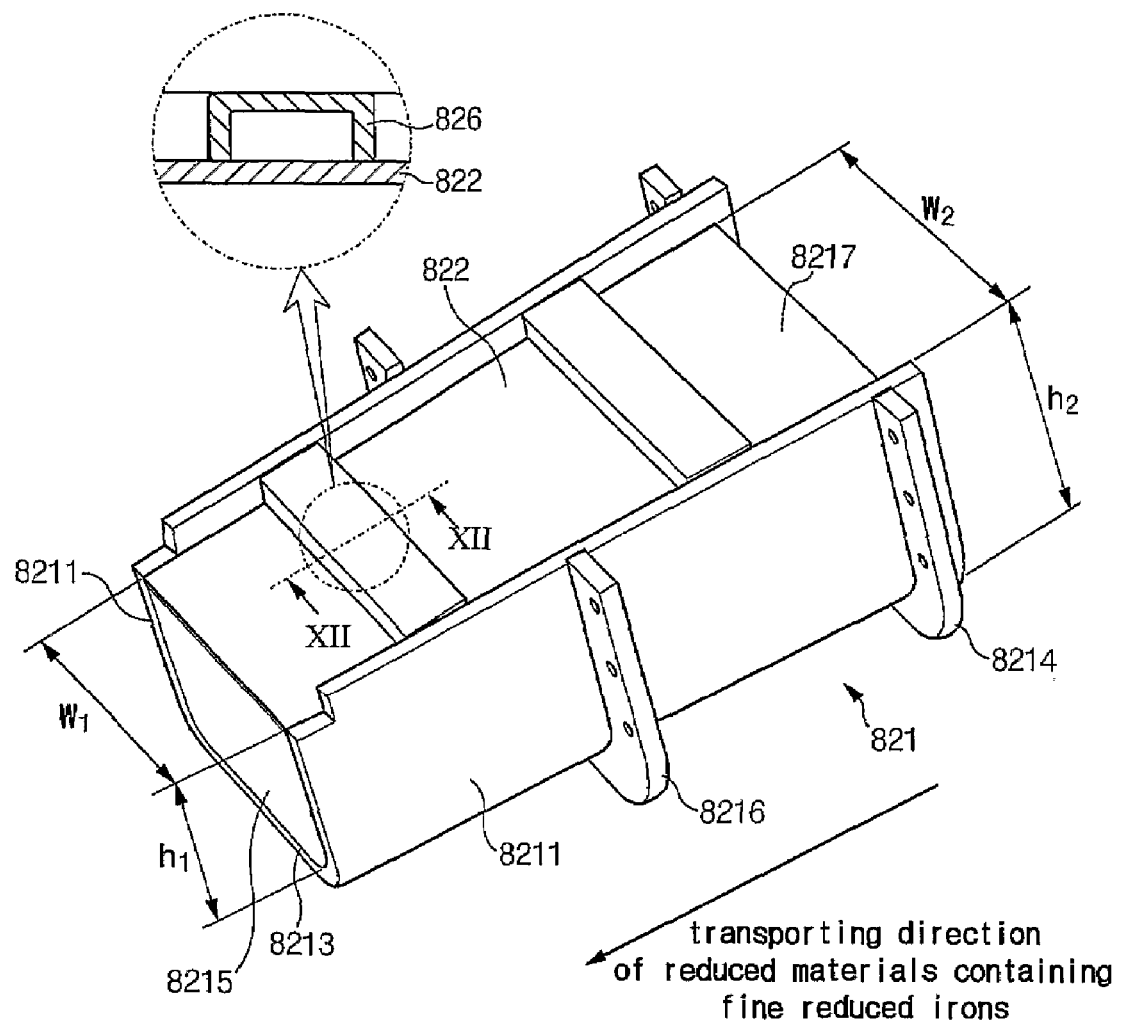
FIG. 12 is a combined perspective view of a linear chute and a linear chute cover shown in FIG. 11.

FIG. 12 shows a state of assembling the first linear chute cover 822 to the first linear chute 821 shown in FIG. 11. As shown in FIG. 12, a section of the first linear chute 821 is almost shaped as a "U" character. The first linear chute 821 can be manufactured to have a shape which is shown in FIG. 12 by bending a plate such as one made from stainless steel. Namely, the first linear chute 821 can be integrally formed. Therefore, since a connecting portion does not exist thereinside, the reduced materials containing fine reduced irons can be smoothly transported through the first linear chute 821.

The first linear chute 821 includes a couple of side portions 8211 and a bottom portion 8213 which is connected thereto. The couple of side portions 821 face each other. A couple of brackets 8214 and 8216 are attached to the side portions 8211 in order to fix the first linear chute 821.

A plurality of supporting channels 826 can be attached on the first linear chute cover 822. The supporting channel 826 is fixed between the external cover 88 and the first linear chute cover 822. The supporting channel 826 blocks high heat and prevents the transporting chute from deforming due to thermal expansion.

The enlarged circle of FIG. 12 shows a section along a line XII-XII of FIG. 12. As shown in the enlarged circle of FIG. 12, the supporting channel 826 can support the first linear chute cover 822 and then prevents the transporting chute from being damaged due to thermal expansion since it is formed to be concavely bent toward the first linear chute cover 822.

As shown in FIG. 12, the first linear chute 821 is tapered along a transporting direction of the reduced materials containing fine reduced irons indicated by an arrow. The openings 8215 and 8217 are formed in both ends of the first linear chute 821. The openings 8215 and 8217 include one end opening 8215 and the other end opening 8217. Since the first linear chute 821 is tapered, a size of one end opening 8215 is smaller than that of the other end opening 8217. Since the first linear chute 821 has such a structure, the reduced materials containing fine reduced irons are not leaked outside and can be smoothly transported in a direction indicated by an arrow.

More specifically, a width $W_1$ of one end opening 8215 is shorter than a width $W_2$ of the other end opening 8217, and a height $h_1$ of one end opening 8215 is shorter than a height $h_2$ of the other end opening 8217. Here, considering a thermal expansion of the first linear chute 821, it is preferable that a difference between the width $W_1$ of one end opening 8215 and the width $W_2$ of the other end opening 8217 is in a range of 10 cm to 25 cm. If the width difference is less than 10 cm, the reduced materials containing fine reduced irons can leak during transportation. In addition, if the width difference is over 25 cm, the reduced materials containing fine reduced irons cannot be smoothly transported and it is difficult for the first linear chute 821 is to be designed since the size of one end opening 8215 is too small. In particular, it is most preferable that the width difference is 20 cm so the reduced materials containing fine reduced irons can be smoothly transported. For the same reason, it is preferable that a difference between a height $h_1$ of one end opening 8215 and a height $h_2$ of the other end opening 8217 is in a range of 10 cm to 25 cm.

Since the plurality of linear chutes of the same shape are continuously connected, the transporting chute 80 as shown in FIG. 11 can be manufactured. Namely, the first linear chute and the second linear chute are continuously connected, and one end opening of the second linear chute is inserted into and is overlapped with the other end opening of the first linear chute. Such a connecting structure is repeated. Therefore, a plurality of linear chutes having the same shape can be continuously connected. This process will be explained in detail with reference to FIG. 13.

Figure 13:
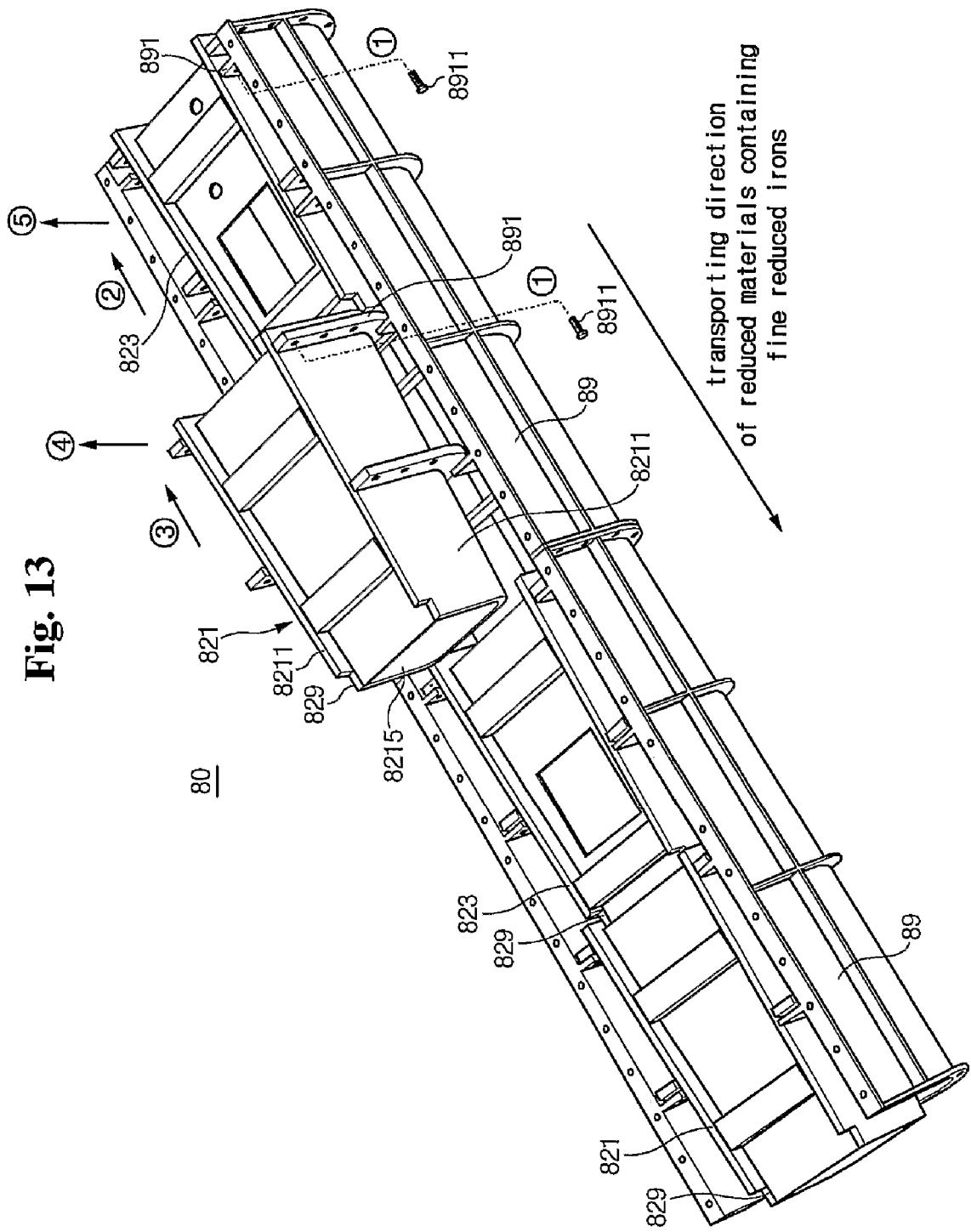
FIG. 13 schematically shows a disassembling process of the transporting chute of FIG. 10.

FIG. 13 schematically shows a disassembling process of the transporting chute 80. FIG. 13 shows a state in which a couple of linear chutes 821 and 8323 are assembled in each of two external casings. In addition, FIG. 13 shows a state in which the external cover 88 is removed from the transporting chute 80.

The process to remove the first linear chute 821 from the transporting chute 80 will be explained as follows. From the most upper end, the transporting chute 80 is removed. The external cover is removed from the transporting chute 80. Therefore, as shown in FIG. 13, internal parts of the transporting chute 80 are exposed to the outside.

Next, a bolt 8911 is removed in a process ①. Although only one bolt 8911 is shown in FIG. 13 for convenience, a plurality of bolts 8911, which are assembled to each assembling opening formed on the bracket 891, are entirely removed in reality. By using this method, the first linear chute 821 and the second linear chute 823 are separated from the external casing 89.

Next, the space for removing the first linear chute 821 is secured by pushing the second linear chute 823 in a direction indicated by an arrow in a process ②. It is preferable that the second linear chute 823 is pushed about 50 cm.

The first linear chute 821 is pushed in a direction indicated by an arrow in a process ③. The first linear chute 821 can be removed from another second linear chute 823 located at a front end thereof by pushing about 20 cm.

The first linear chute 821 is lifted up in a process ④. Therefore, the first linear chute 821 can be easily removed from the transporting chute 80. Since the first linear chute 821 is removed, the second linear chute 823 located in the latter part can also be easily removed.

That is, the second linear chute 823 can be lifted up and be removed from the transporting chute 80 in a process ⑤. By using the same method, the following first linear chute 821 and the following second linear chute 823 can also be removed.

By using the above-mentioned method, the transporting chute 80 can be easily disassembled in a short time. Therefore, maintenance and repair of the transporting chute 80 become easy. An assembling process of the transporting chute 80 can be carried out in the reverse of the above-mentioned disassembling process.

A stepping portion 829 is formed in the first linear chute 821 and the second linear chute 823 in order for the linear chutes 821 and 823 to be easily disassembled from each other. For example, with regard to the first linear chute 821, the stepping portion 829 is formed on one end of a couple of the side portions 8211 which form one end opening 8215. The stepping portion 829 becomes lower and lower along the transporting direction of the reduced materials containing fine reduced irons indicated by an arrow.

Since the stepping portion 829 is formed on the linear chutes 821 and 823, it is easy for the linear chutes 821 and 823 to be inserted into each other. Therefore, the linear chutes 821 and 823 can be repeatedly arranged and be connected thereto. Since the linear chutes 821 and 823 are inserted into each other and are overlapped with each other, the linear chutes 821 and 823 are assembled to be telescoping. The reduced materials containing fine reduced irons can be smoothly transported through the linear chutes which are assembled in this way.

Figure 14:
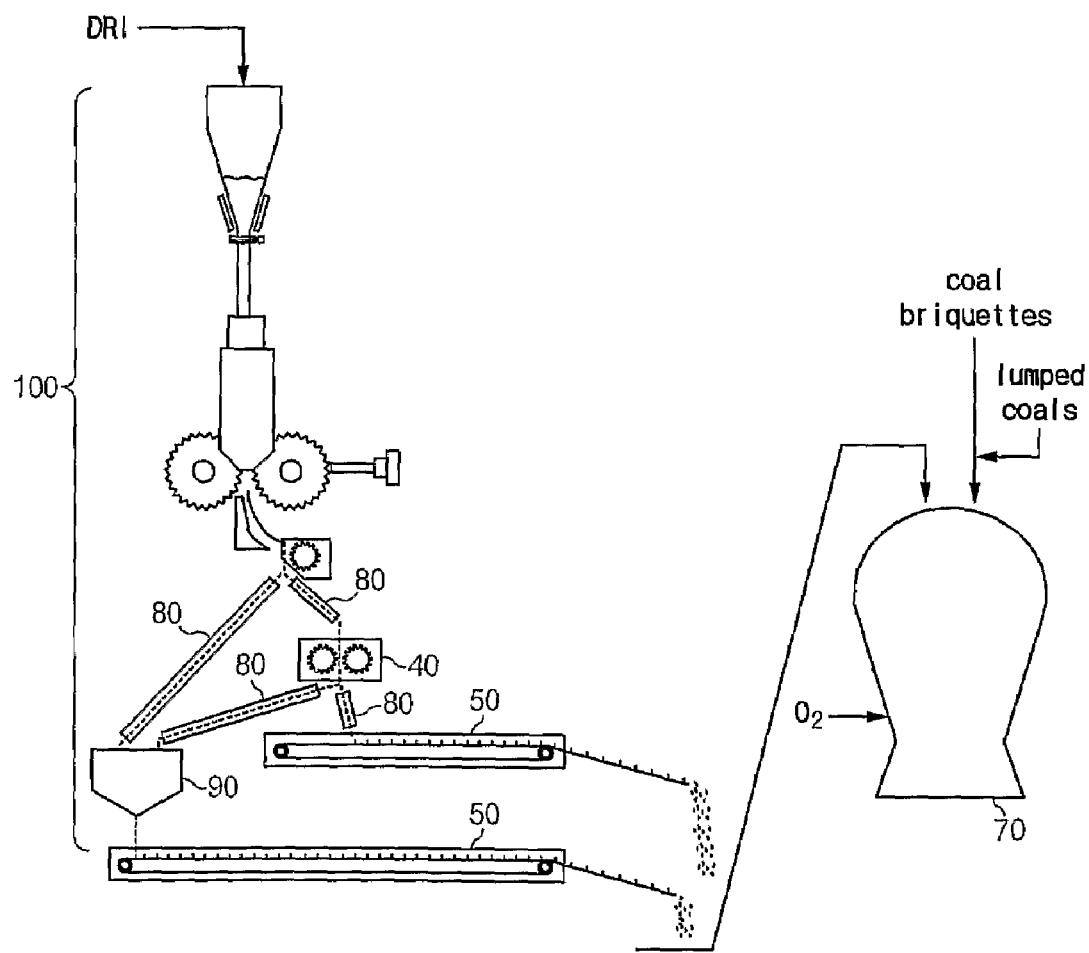
FIG. 14 schematically shows an apparatus for manufacturing molten irons provided with the apparatus for manufacturing compacted irons according to the first embodiment of the present invention.

FIG. 14 shows an apparatus for manufacturing molten irons 200 provided with the apparatus for manufacturing compacted irons 100 according to the first embodiment of the present invention. Although the apparatus for manufacturing molten irons 200 provided with the apparatus for manufacturing compacted irons 100 according to the first embodiment of the present invention is shown in FIG. 1, this is merely to illustrate the present invention and the present invention is not limited thereto. Therefore, the apparatus for manufacturing molten irons 200 can also be provided with the apparatus for manufacturing compacted irons according to the second embodiment of the present invention and the third embodiment of the present invention.

The apparatus for manufacturing molten irons 200 shown in FIG. 14 includes an apparatus for manufacturing compacted irons 100 and the melter-gasifier 70. The compacted irons, which have crushed in the apparatus for manufacturing compacted irons 100, are charged into the melter-gasifier 70 and are melted therein. Since the structure of the melter-gasifier 70 is obvious to the skilled art in a technical field of the present invention, a detailed description thereof is omitted.

One or more of coals selected from a group of lumped coals and coal briquettes are supplied to the melter-gasifier 70. Generally, for example, the lumped coals are coals having grain size over 8 mm which are gathered from the producing district. In addition, for example, the coal briquettes are coals which are made by gathering coals having grain size of 8 mm or less from the producing district, pulverizing them, and molding them with a press.

The coal packed bed is formed in the melter-gasifier 70 by charging lumped coals or coal briquettes therein. Oxygen is supplied to the melter-gasifier 70 and then the compacted irons are melted. Molten irons are discharged through a tap. Therefore, it is possible to manufacture molten irons having good quality.

Since the apparatus for manufacturing compacted irons has the above-mentioned structure, it is suitable to manufacture a large amount of the reduced materials containing fine reduced irons into the compacted irons. In addition, since the apparatus for manufacturing molten irons according to the present invention includes the above-mentioned apparatus for manufacturing compacted irons, molten irons having a good quality can be manufactured.

The experimental examples of the present invention will be explained below. The experimental examples of the present invention mentioned later are merely to illustrate the present invention and the present invention is not limited thereto.

EXPERIMENTAL EXAMPLES

A simulation was carried out by analyzing a shape of the guide chute for suitably guiding compacted irons. The simulation was carried out by using I-DEAS structure analysis software. In the simulation, a shape of a plate with a length of 1300 mm and a width of 94 mm of which a surface is engraved was modeled in order to have a shape to be similar to that of the compacted irons. The shape of a plate was engraved to be a strip type or a pocket type. Next, a compulsory deformation by the guide chute was applied to the plate, and an upper discharging point and a lower crushing point were fixed. That is, although a guide chute was not really used, the plate was simulated to be bent by applying a compulsory deformation in order for the plate to be in the same state that it would be when it advances through the guide chute. Since other conditions of the simulation can be easily understood by those skilled art in the technical field of the present invention, so a detailed description thereof will be omitted.

Experimental Example 1

Figure 15:
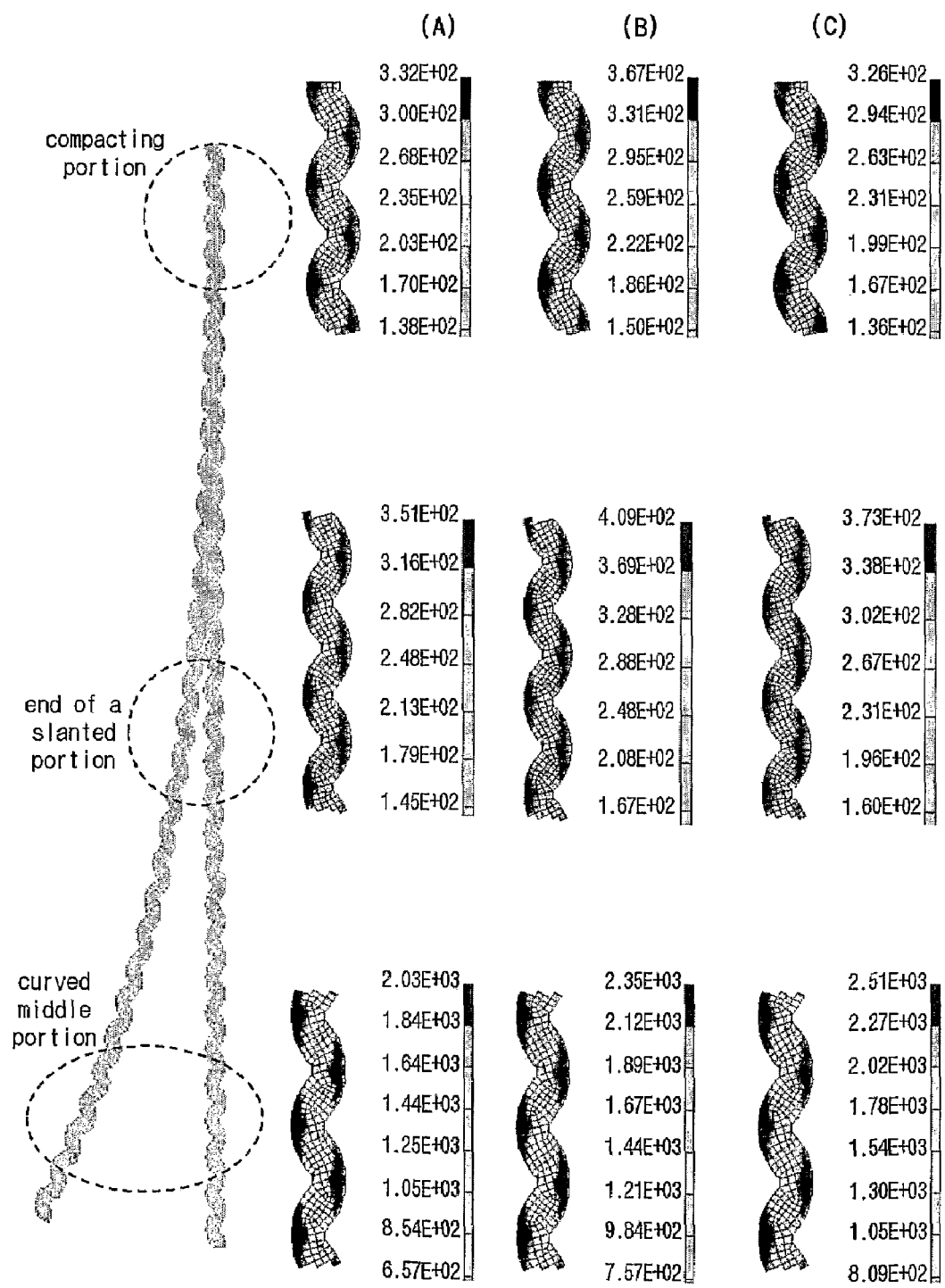
FIG. 15 shows a stress distribution of a strip-shaped plate according to Exemplary Example 1 to Exemplary Example 3 of the present invention.

The shape of the plate was deformed in two dimensions by applying a compulsory deformation by the guide chute to a plate with a shape of an engraved strip. After an upper portion of the strip-shaped plate was made to be slanted at 10 degrees to the vertical direction and a lower portion of the strip-shaped plate was made to be bent in order for the radius of curvature thereof to be 1550 mm, stresses were measured in a compacting portion, an end of a slanted portion, and a curved middle portion of the strip-shaped plate. The left side of FIG. 15 shows a point where the stress of the strip-shaped plate according to the experimental examples of the present invention was measured, and the right side (A) of FIG. 15 shows a mean stress distribution at each point of the strip-shaped plate according to Experimental Example 1 of the present invention. The stress measured in Experimental Example 1 is shown in Table 1 below.

Experimental Example 2

After an upper portion of the strip-shaped plate was made to be slanted at 10 degrees to the vertical direction and a lower portion of the strip-shaped plate was made to be bent in order for the radius of curvature thereof to be 1800 mm, stresses were measured at a compacting portion, an end of a slanted portion, and a curved middle portion of the strip-shaped plate. The left side of FIG. 15 shows a point where the stress of the strip-shaped plate according to the experimental examples of the present invention was measured, and the right side (B) of FIG. 15 shows a mean stress distribution at each point of the strip-shaped plate according to Experimental Example 2 of the present invention. The stress measured in Experimental Example 2 is shown in Table 1 below. The rest of the experimental conditions were the same as those of the above-mentioned Experimental Example 1.

Experimental Example 3

After an upper portion of the strip-shaped plate was made to be slanted at 7 degrees to the vertical direction and a lower portion of the strip-shaped plate was made to be bent in order for the radius of curvature thereof to be 1800 mm, stresses were measured at a compacting portion, an end of a slanted portion, and a curved middle portion of the strip-shaped plate. The left side of FIG. 15 shows a point where the stress of the strip-shaped plate according to Experimental examples of the present invention was measured, and the right side (C) of FIG. 15 shows a mean stress distribution at each point of the strip-shaped plate according to Experimental Example 3 of the present invention. The stress measured in Experimental Example 3 is shown in Table 1 below. The rest of the experimental conditions were the same as those of the above-mentioned Experimental Example 1.

Experimental Example 4

Figure 16:
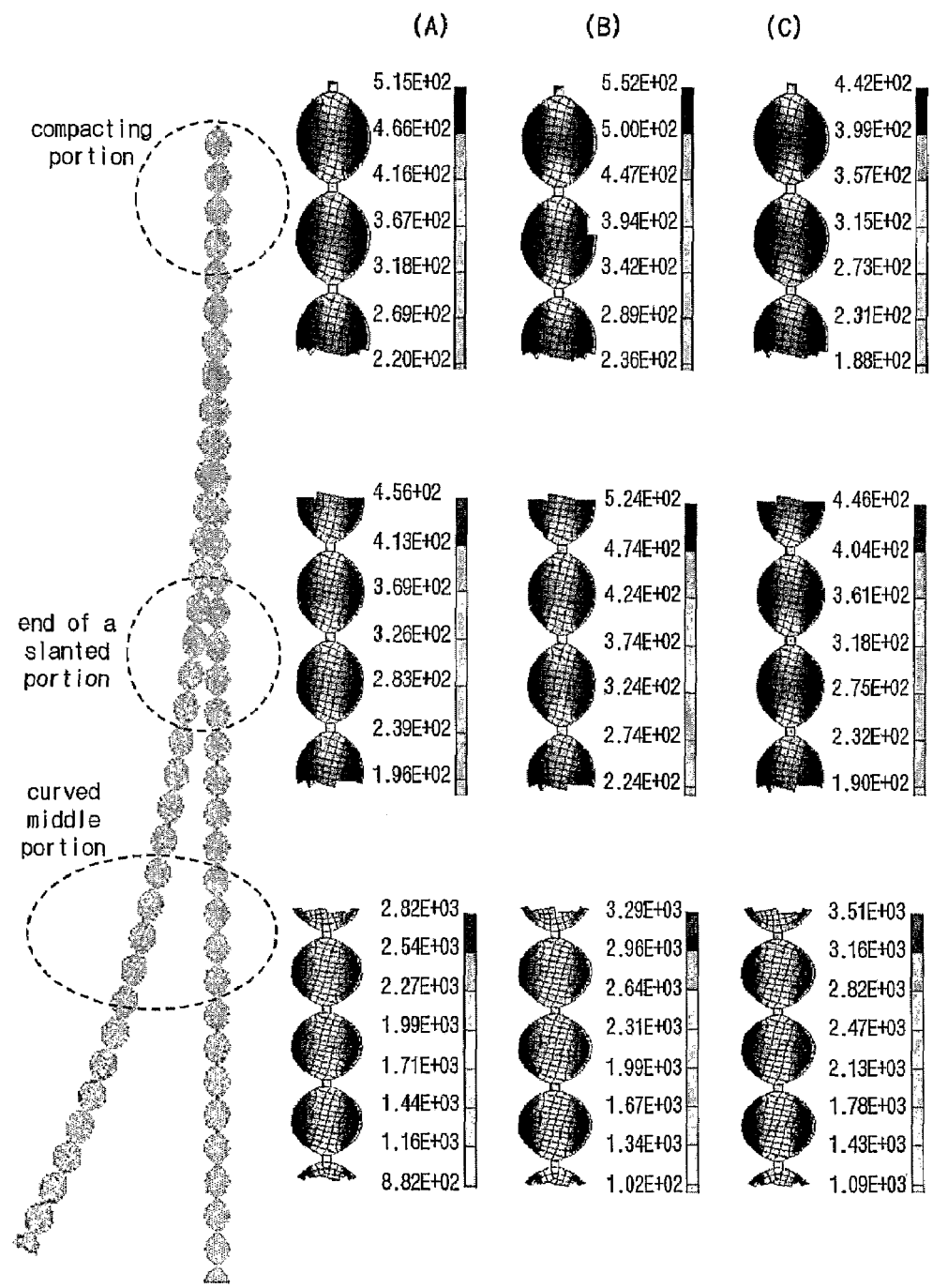
FIG. 16 shows a stress distribution of a pocket-shaped plate according to Exemplary Example 4 to Exemplary Example 6 of the present invention.

The shape of the plate was deformed into two dimensions by applying a compulsory deformation by the guide chute to a plate with a shape of an engraved pocket. After an upper portion of the pocket-shaped plate was made to be slanted at 10 degrees to the vertical direction and a lower portion of the pocket-shaped plate was made to be bent in order for the radius of curvature thereof to be 1550 mm, stresses were measured at a compacting portion, an end of a slanted portion, and a curved middle portion of the pocket-shaped plate. The left side of FIG. 16 shows a point where the stress of the pocket-shaped plate according to experimental examples of the present invention was measured, and the right side (A) of FIG. 16 shows a mean stress distribution at each point of the pocket-shaped plate according to Experimental Example 4 of the present invention. The stress measured in Experimental Example 4 is shown in Table 1 below.

Experimental Example 5

After an upper portion of the pocket-shaped plate was made to be slanted at 10 degrees to the vertical direction and a lower portion of the pocket-shaped plate was made to be bent in order for the radius of curvature thereof to be 1800 mm, stresses were measured at a compacting portion, an end of a slanted portion, and a curved middle portion of the pocket-shaped plate. The left side of FIG. 16 shows a point where the stress of the pocket-shaped plate according to Experimental Examples of the present invention was measured, and the right side (B) of FIG. 16 shows a mean stress distribution in each point of the pocket-shaped plate according to Experimental Example 5 of the present invention. The stress measured in Experimental Example 5 is shown in Table 1 below. The rest of the experimental conditions were the same as those of the above-mentioned Experimental Example 4.

Experimental Example 6

After an upper portion of the pocket-shaped plate was made to be slanted at 7 degrees to the vertical direction and a lower portion of the pocket-shaped plate was made to be bent in order for the radius of curvature thereof to be 1800 mm, stresses were measured at a compacting portion, an end of a slanted portion, and a curved middle portion of the pocket-shaped plate. The left side of FIG. 16 shows a point where the stress of the pocket-shaped plate according to Experimental Examples of the present invention was measured, and the right side (C) of FIG. 16 shows a mean stress distribution in each point of the pocket-shaped plate according to Experimental Example 6 of the present invention. The stress measured in Experimental Example 6 is shown in Table 1 below. The rest of the experimental conditions were the same as those of the above-mentioned Experimental Example 4.

Example 6, if an upper portion of the pocket-shaped plate was made to be slanted at 7 degrees to the vertical direction and a lower portion of the pocket-shaped plate was made to be bent in order for the radius of curvature thereof to be 1800 mm, it was possible to minimize stress that is applied to the pocket-shaped plate.

Meanwhile, the strip-shaped plate and the pocket-shaped plate, which were simulated in two dimensions in Experimental Examples 3 and 6, respectively, were simulated in Experimental Examples 7 and 8 of the present invention. Therefore, more accurate stresses were measured. The conditions of Experimental Examples 7 and 8 were as follows.

Experimental Example 7

Figure 17:
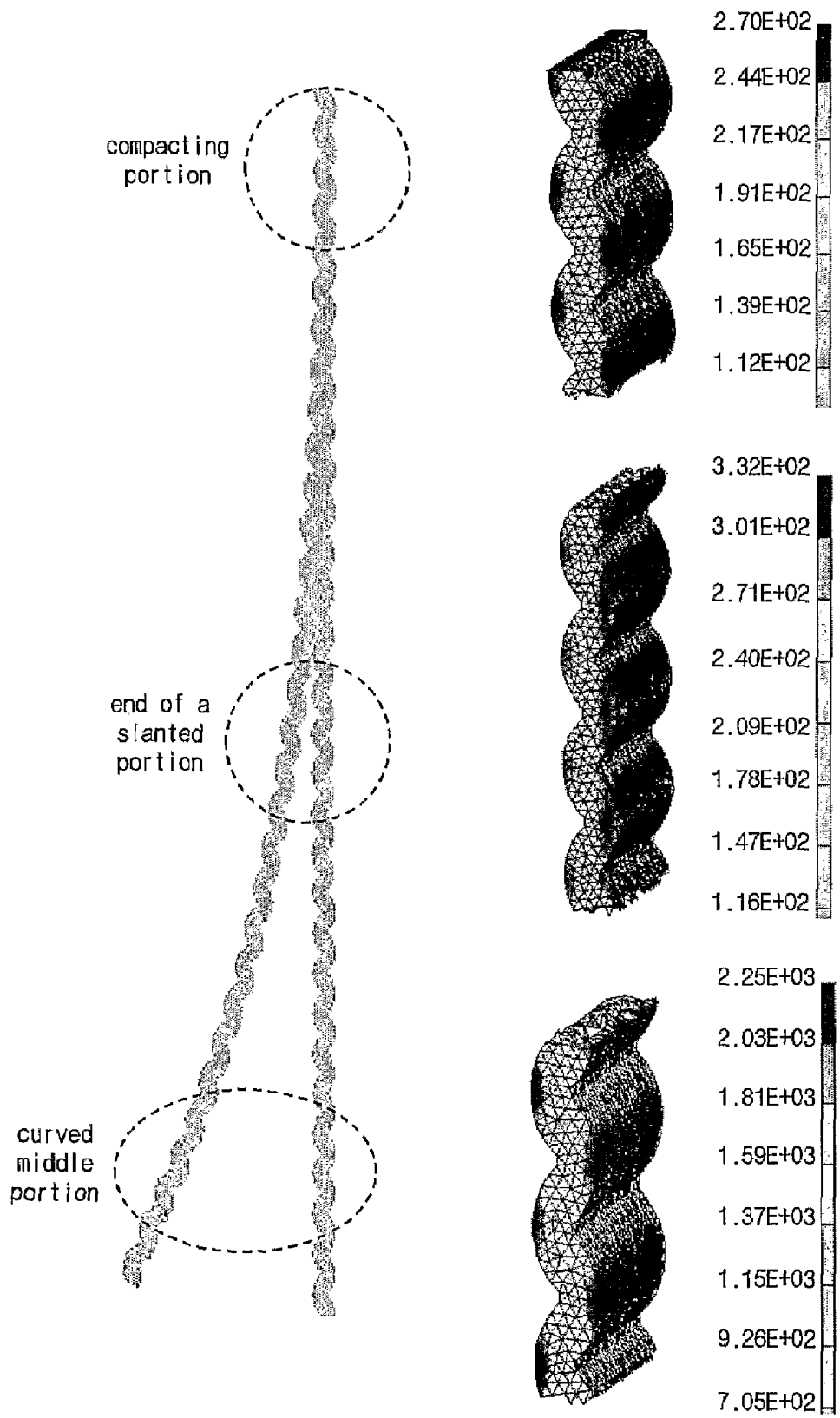
FIG. 17 shows a stress distribution of a strip-shaped plate according to Exemplary Example 7 of the present invention.

The shape of the plate was deformed into three dimensions by applying a compulsory deformation by the guide chute to a plate with a shape of an engraved strip. After an upper portion of the strip-shaped plate was made to be slanted at 7 degrees to the vertical direction and a lower portion of the strip-shaped plate was made to be bent in order for the radius of curvature thereof to be 1800 mm, stresses were measured at a compacting portion, an end of a slanted portion, and a curved middle portion of the strip-shaped plate. The left side of FIG. 17 shows a point where the stress of the strip-shaped plate according to experimental examples of the present invention was measured, and the right side of FIG. 17 shows a mean stress distribution at each point of the strip-shaped

TABLE 1

| | | strip-shaped plate | | | pocket-shaped plate | unit of stress: kg/mm² | |
|---|---|---|---|---|---|---|---|
| | classification | Experimental Example 1 | Experimental Example 2 | Experimental Example 3 | Experimental Example 4 | Experimental Example 5 | Experimental Example 6 |
| stress generating point | compacting portion | 332 | 367 | 316 | 512 | 552 | 442 |
| | end of a slanted portion | 350 | 409 | 312 | 456 | 524 | 446 |
| | curved middle portion | 2230 | 2350 | 2011 | 2820 | 3290 | 2510 |

As shown in Table 1, in the Experimental Example 3 of the present invention regarding a strip-shaped plate, the stress of the compacting point was 316 kg/mm2, the stress of the end of a slanted portion was 312 kg/mm2, and the stress of the curved middle portion was 2011 kg/mm2. Therefore, the stress measured in Experimental Example 3 was less than those measured in Experimental examples 1 and 2. Like Experimental Example 3, if an upper portion of the strip-shaped plate was made to be slanted at 7 degrees to the vertical direction and a lower portion of the strip-shaped plate was made to be bent in order for the radius of curvature thereof to be 1800 mm, it was possible to minimize the stress that is applied to the strip-shaped plate.

Meanwhile, in Experimental Example 6 of the present invention regarding a pocket-shaped plate, the stress of the compacting point was 442 kg/mm2, the stress of the end of a slanted portion was 446 kg/mm2, and the stress of the curved middle portion was 2510 kg/mm2. Therefore, the stress measured in Experimental Example 6 was less than those measured in Experimental Examples 4 and 5. Like Experimental plate according to Experimental Example 7 of the present invention. The stress measured in Experimental Example 7 is shown in Table 2 below.

Experimental Example 8

Figure 18:
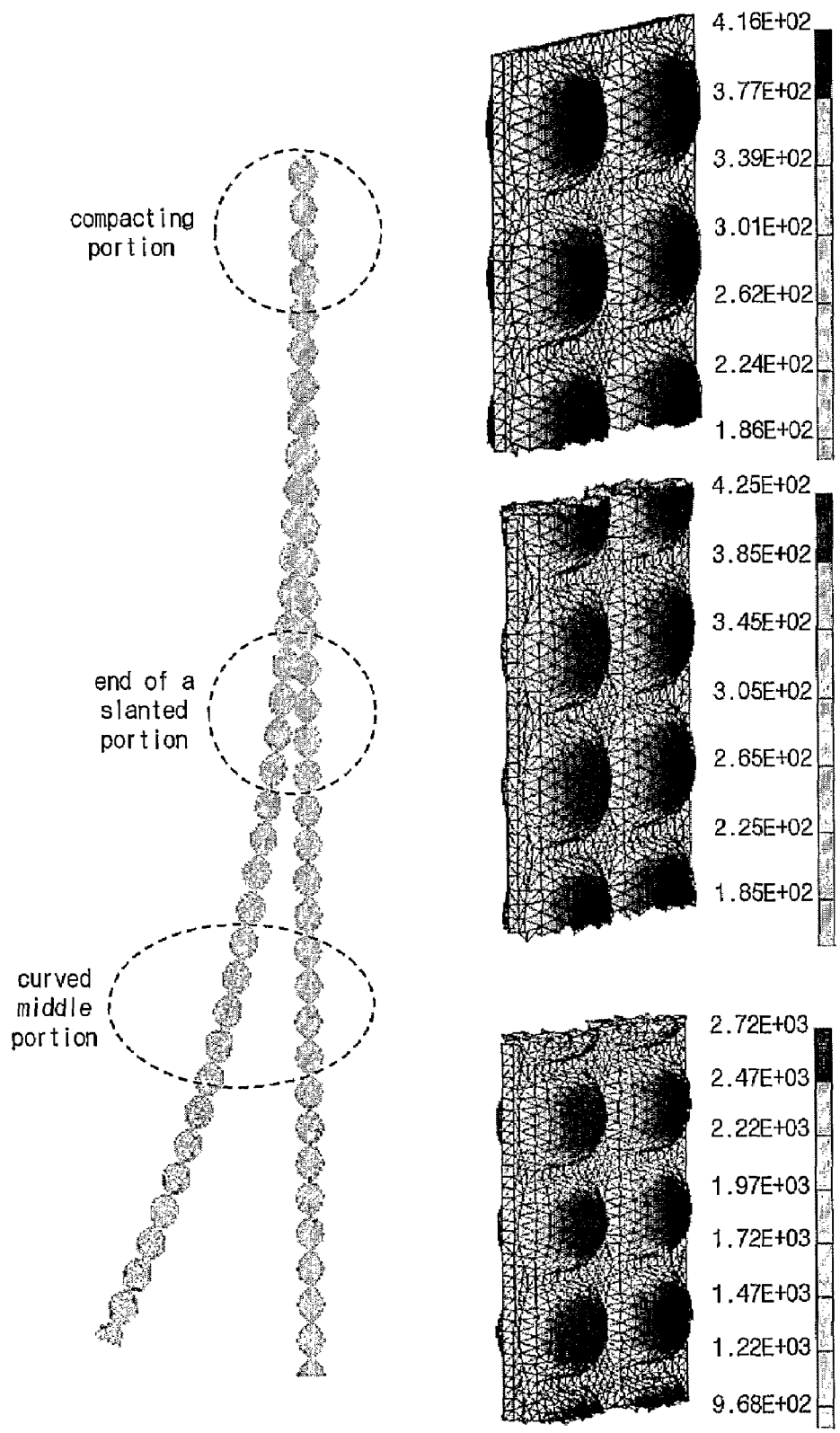
FIG. 18 shows a stress distribution of a pocket-shaped plate according to Exemplary Example 8 of the present invention.

The shape of the plate was deformed into three dimensions by applying a compulsory deformation by the guide chute to a plate with a shape of an engraved pocket. After an upper portion of the pocket-shaped plate was made to be slanted at 7 degrees to the vertical direction and a lower portion of the strip-shaped plate was made to be bent in order for the radius of curvature thereof to be 1800 mm, stresses were measured at a compacting portion, an end of a slanted portion, and a curved middle portion of the pocket-shaped plate. The left side of FIG. 18 shows a point where the stress of the strip-shaped plate according to the experimental example of the present invention was measured, and the right side of FIG. 18 shows a mean stress distribution at each point of the strip-shaped plate according to Experimental Example 8 of the present invention. The stress measured in Experimental Example 8 is shown in Table 2 below.

TABLE 2

| classification | | strip-shaped plate Experimental Example 7 | pocket-shaped plate Experimental Example 8 |
|---|---|---|---|
| stress generating point | compacting portion | 270 kg/mm² | 416 kg/mm² |
| | end of a slanted portion | 303 kg/mm² | 425 kg/mm² |
| | curved middle portion | 2001 kg/mm² | 2320 kg/mm² |

As shown in Table 2, in Experimental Example 7 of the present invention, the stress of the compacting point was 270 kg/mm2, the stress of the end of a slanted portion was 303 kg/mm2, and the stress of the curved middle portion was 2001 kg/mm2. If an upper portion of the strip-shaped plate was made to be slanted at 7 degrees to the vertical direction and a lower portion of the strip-shaped plate was made to be bent in order for the radius of curvature thereof to be 1800 mm in the Experimental Example 7, it was possible to minimize stress that is applied to the strip-shaped plate.

In addition, in Experimental Example 8 of the present invention, the stress of the compacting point was 416 kg/mm2, the stress of the end of a slanted portion was 425 kg/mm2, and the stress of the curved middle portion was 2320 kg/mm2. If an upper portion of the pocket-shaped plate was made to be slanted at 7 degrees to the vertical direction and a lower portion of the pocket-shaped plate was made to be bent in order for the radius of curvature thereof to be 1800 mm in the Experimental Example 8, it was possible to minimize stress that was applied to the pocket-shaped plate.

In the apparatus for manufacturing compacted iron according to the present invention, the compacted irons can be smoothly and continuously discharged since a guiding surface of the guide chute includes a straight slanted surface and a curved slanted surface. Therefore, a process is smoothly advanced and a generating amount of particles due to broken compacted irons can be minimized. In addition, an impact, which is caused by the crusher crushing impacted irons, can be absorbed to be minimized and thermal load of the apparatus which is located at a latter part of the guide chute can be minimized.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An apparatus for manufacturing compacted irons comprising:
   a couple of rollers for compacting reduced materials containing fine reduced irons and manufacturing compacted irons;
   a guide chute for guiding the compacted irons which are discharged from the couple of rollers; and
   crushers for crushing compacted irons which are guided into the guide chute; and
   a transporting chute under a lower portion of the couple of rollers for transporting the compacted irons, wherein the transporting chute comprises a plurality of linear chutes connected to each other and a size of one end opening of the linear chute is smaller than a size of the other end opening of the linear chute;
   wherein a guiding surface of the guide chute, which guides the compacted irons, comprises a straight slanted surface and a curved slanted surface,
   wherein the upper portion of the guiding surface is formed to be a straight slanted surface and the lower portion of the guiding surface is formed to be a curved slanted surface which is connected to the straight slanted surface,
   wherein the curved slanted surface of the guiding surface is concave-shaped surface,
   wherein the crushers comprises a first crusher for coarsely crushing the compacted irons manufactured by the couple of rollers; and a second crusher for re-crushing the coarsely crushed compacted irons, and
   wherein the transporting chute comprises a plurality of external casings enclosing the plurality of linear chutes and an external cover attached to each of the external casings.

2. The apparatus for manufacturing compacted irons of claim 1, wherein the couple of rollers comprises a fixed roller and a moving roller facing the fixed roller; and wherein a distance from an upper end portion of the guiding surface to a center of the fixed roller is not less than a sum of a radius of the fixed roller and a half of a mean thickness of the compacted irons.

3. The apparatus for manufacturing compacted irons of claim 2, wherein the distance from the upper end portion of the guiding surface to the center of the fixed roller is not more than a sum of the radius of the fixed roller and a mean thickness of the compacted irons.

4. The apparatus for manufacturing compacted irons of claim 2, wherein the upper end portion of the guiding surface is closer to the fixed roller than to the moving roller.

5. The apparatus for manufacturing compacted irons of claim 2, wherein the upper end portion of the guiding surface is located at a position which is not higher than a height of the center axis of the fixed roller and is not lower than a surface height of the lower end portion of the fixed roller.

6. The apparatus for manufacturing compacted irons of claim 1, wherein a ratio of a height of the upper portion of the guiding surface to a height of the lower portion of the guiding surface is in a range of 5.0 to 6.0.

7. The apparatus for manufacturing compacted irons of claim 1, wherein an angle made between the straight slanted surface and a vertical direction is in a range of 6 degrees to 8 degrees.

8. The apparatus for manufacturing compacted irons of claim 7, wherein an angle made between the straight slanted surface and a vertical direction is substantially 7 degrees.

9. The apparatus for manufacturing compacted irons of claim 1 wherein a radius of curvature of the curved slanted surface is in a range of 1700 mm to 1900 mm.

10. The apparatus for manufacturing compacted irons of claim 9 wherein the radius of curvature of the curved slanted surface is substantially 1800 mm.

11. The apparatus for manufacturing compacted irons of claim 1 wherein a ratio of height of the guide chute to a length of a base line of the guide chute is in a range of 1.0 to 2.0.

12. The apparatus for manufacturing compacted irons of claim 1 wherein concave grooves are continuously formed on a surface of each roller along the axis direction of the roller and a plurality of protruded portions are formed on the concave grooves to be separated from each other.

13. The apparatus for manufacturing compacted irons of claim 12 wherein the protruded portions are shaped as notches and are protruded toward a circumference direction of the couple of rollers.

14. The apparatus for manufacturing compacted irons of claim 13 wherein a thickness of the protruding portion becomes shorter toward a center of the protruding portion.

15. The apparatus for manufacturing compacted irons of claim 12 wherein a pitch between a plurality of protruding portions is in a range of 16 mm to 45 mm.

16. The apparatus for manufacturing compacted irons of claim 1 wherein the first crusher coarsely crushes the compacted irons in order for a mean grain size of the compacted irons to be more than 0 mm and not more than 50 mm.

17. The apparatus for manufacturing compacted irons of claim 16 wherein the first crusher coarsely crushes the compacted irons in order for a mean grain size of the compacted irons to be more than 0 mm and not more than 30 mm.

18. The apparatus for manufacturing compacted irons of claim 1 wherein the compacted irons crushed in the second crusher comprise:
- more than 0 wt % and not more than 30 wt % of compacted irons having a grain size in a range of 25 mm to 30 mm;
- not less than 55 wt % and less than 100 wt % of compacted irons having a grain size in a range of 5 mm to 25 mm; and
- more than 0 wt % and not more than 15 wt % of compacted irons having a grain size of less than 5 mm.

19. The apparatus for manufacturing compacted irons of claim 1 wherein the first crusher comprises:
- a plurality of crushing plates installed side by side along the axis of the first crusher in order to be operated together, the crushing plate formed with a plurality of protrusions which are separated from each other, the plurality of protrusions formed on the circumference of the crushing plate; and
- a spacer ring inserted between the plurality of crushing plates and controllering the gap between the crushing plates; and
- wherein the compacted irons are coarsely crushed by the plurality of protrusions as the plurality of crushing plates are operated.

20. The apparatus for manufacturing compacted irons of claim 1 wherein the first crusher comprises an integrated body on a circumference of which a plurality of protrusions are formed to be separated from each other and the compacted irons are coarsely crushed by the plurality of protrusions as the first crusher is operated.

21. The apparatus for manufacturing compacted irons of claim 1 further comprising a dumping storage bin for temporarily storing the crushed compacted irons and wherein the first crusher and the second crusher are connected to the dumping storage bin through a transporting chute.

22. The apparatus for manufacturing compacted irons of claim 1 wherein the second crusher comprises a couple of crushing rollers installed to be separated from each other and provided with a plurality of crushing disks, and the coarsely crushed compacted irons are re-crushed by a plurality of blades formed on the circumference of the crushing disks by operating the couple of crushing rollers in opposite directions to each other.

23. The apparatus for manufacturing compacted irons of claim 22 wherein one crushing roller is a fixed roller and the other crushing roller is a moving roller among the couple of rollers and the gap between the couple of crushing rollers is controllably varied.

24. The apparatus for manufacturing compacted irons of claim 22, wherein the blade comprises a first slanted surface directed to a rotating direction of the crushing roller and a second slanted surface directed to an opposite rotating direction of the crushing roller, and wherein a first slanted angle made between the first slanted surface and a circumference of the crushing roller is larger than a second slanted angle made between the second slanted surface and the circumference of the crushing roller.

25. The apparatus for manufacturing compacted irons of claim 24, wherein one or more angles among the first slanted angle and the second slanted angle are in a range of 80 degrees to 90 degrees.

26. The apparatus for manufacturing compacted irons of claim 24, wherein one or more angles among the first slanted angle and the second slanted angle are in a range of 40 degrees to 50 degrees.

27. The apparatus for manufacturing compacted irons of claim 22, wherein the couple of crushing rollers comprise a first crushing roller and a second crushing roller and wherein a plurality of first blades formed on a circumference of the first crushing roller face a space between the plurality of second blades formed on a circumference of the second crushing roller.

28. The apparatus for manufacturing compacted irons of claim 27, wherein a distance from an end portion of the first blade to a surface of the second crushing roller facing the end portion of the first blade is in a range of 10 mm to 20 mm.

29. The apparatus for manufacturing compacted irons of claim 27, wherein the end portion of each blade is chamfered.

30. The apparatus for manufacturing compacted irons of claim 29, wherein a chamfered surface formed on the end portion of the first blade and a chamfered surface formed on the end portion of the second blade, which is closest to the first blade, face each other.

31. The apparatus for manufacturing compacted irons of claim 30, wherein a distance from a chamfered surface formed on an upper end portion of the first blade and a chamfered surface formed on an upper end portion of the second blade, which is closest to the first blade, is in a range of 10 mm to 15 mm.

32. The apparatus for manufacturing compacted irons of claim 1, wherein the second crusher comprises a couple of crushing rollers separated from each other and wherein the coarsely crushed compacted irons are re-crushed by a plurality of blades formed on a circumference of the couple of crushing rollers by rotating the couple of rollers comprising an integrated body in opposite directions to each other.

33. The apparatus for manufacturing compacted irons of claim 1, wherein the plurality of linear chutes comprise a first linear chute and a second linear chute and wherein one end opening of the second linear chute is inserted into and is overlapped with the other end opening of the first linear chute.

34. The apparatus for manufacturing compacted irons of claim 33, wherein the size of the first linear chute is the same as the size of the second linear chute.

35. The apparatus for manufacturing compacted irons of claim 33, wherein the second linear chute and the first linear chute are repeatedly arranged in order along the transporting direction of the reduced materials containing fine reduced irons.

36. The apparatus for manufacturing compacted irons of claim 35, wherein one end opening of another first linear chute is inserted into and is overlapped with the other end opening of the second linear chute.

37. The apparatus for manufacturing compacted irons of claim 1, wherein each of the linear chute comprises a couple of side portions facing each other and a bottom portion which connects the couple of side portions together.

38. The apparatus for manufacturing compacted irons of claim 37, wherein each of the linear chutes is integrally formed.

39. The apparatus for manufacturing compacted irons of claim 37, wherein a stepping portion, which becomes along the transporting direction of the reduced materials containing fine reduced irons, is formed on one end of the couple of the side portions forming one end opening of the linear chute.

40. The apparatus for manufacturing compacted irons of claim 1, wherein a linear chute cover is attached on the linear chute.

41. The apparatus for manufacturing compacted irons of claim 40, wherein a plurality of N2 purging connecting parts are installed on the external casing, and the plurality of N2 purging connecting parts are inserted into the transporting chute through an opening formed in the linear chute cover.

42. The apparatus for manufacturing compacted irons of claim 41, wherein the plurality of N2 purging connecting parts comprise a first N2 purging connecting part and a second N2 purging connecting part, and wherein the first N2 purging connecting part is installed to be slanted toward a lower portion of the transporting chute and the second N2 purging connecting part is installed to be slanted toward an upper portion of the transporting chute.

43. The apparatus for manufacturing compacted irons of claim 41, wherein a plurality of supporting channels are fixed between the external cover and the linear chute cover.

44. The apparatus for manufacturing compacted irons of claim 43, wherein the supporting channel is concavely bent toward the linear chute cover.

45. The apparatus for manufacturing compacted irons of claim 40, wherein a manhole is attached to the external cover and the manhole faces the opening formed on the linear chute cover.

46. The apparatus for manufacturing compacted irons of claim 1, wherein a couple of brackets are attached to a side portion of the linear chute in order along a transporting direction of the reduced materials containing fine reduced irons.

47. The apparatus for manufacturing compacted irons of claim 46, wherein the couple of brackets comprise a first bracket and a second bracket, and wherein the first bracket and the second bracket are attached in order along the transporting dirction of the reduced materials containing fine reduced irons.

48. The apparatus for manufacturing compacted irons of claim 47, wherein a plurality of fixing portions are formed in the external casing and the bracket is fixed to the fixing portion.

49. The apparatus for manufacturing compacted irons of claim 48, wherein the plurality of fixing portions comprise a first fixing portion and a second portion which is separated from the first fixing portion, and the first bracket is combined with the first fixing portion with a screw.

50. The apparatus for manufacturing compacted irons of claim 49, wherein the second fixing portion is fixed to be separated from the second bracket.

51. The apparatus for manufacturing compacted irons of claim 1, wherein two of the linear chutes are installed in the external casing.

52. The apparatus for manufacturing compacted irons of claim 1, wherein lagging materials are filled between the external casing and the linear chute.

53. The apparatus for manufacturing compacted irons of claim 1, wherein a difference between a width of one end opening of the linear chute and a width of the other end opening of the linear chute is in a range of 10 cm to 25 cm.

54. The apparatus for manufacturing compacted irons of claim 1, wherein a difference between a height of one end opening of the linear chute and a height of the other end opening of the linear chute is in a range of 10 cm to 25 cm.

55. The apparatus for manufacturing compacted irons of claim 1, wherein the reduced materials containing fine reduced irons further comprise sintered additives.

56. The apparatus for manufacturing molten irons comprising:
the apparatus for manufacturing compacted irons of claim 1; and
a melter-gasifier in which the compacted irons are charged and melted.

57. The apparatus for manufacturing molten irons of claim 56, wherein one or more coals selected from the group of lumped coals and coal briquettes are supplied to the melter-gasifier.

* * * * *